(12) United States Patent
Gagliano et al.

(10) Patent No.: US 12,314,679 B2
(45) Date of Patent: May 27, 2025

(54) AUTOMATED NARRATIVE PRODUCTION SYSTEM AND SCRIPT PRODUCTION METHOD WITH REAL-TIME INTERACTIVE CHARACTERS

(71) Applicant: TRANSITIONAL FORMS INC., Toronto (CA)

(72) Inventors: Pietro Gagliano, Toronto (CA); Dante Camarena Jiménez, Toronto (CA); Nicholas Counter, Toronto (CA); Liam Atticus Clarke, Toronto (CA)

(73) Assignee: Transitional Forms Inc., Toronto (CA)

( * ) Notice: Subject to any disclaimer, the term of this patent is extended or adjusted under 35 U.S.C. 154(b) by 210 days.

(21) Appl. No.: 17/861,870

(22) Filed: Jul. 11, 2022

(65) Prior Publication Data

US 2023/0027035 A1 Jan. 26, 2023

Related U.S. Application Data

(60) Provisional application No. 63/220,442, filed on Jul. 9, 2021.

(51) Int. Cl.
*G06F 40/56* (2020.01)
*G06F 40/103* (2020.01)
(Continued)

(52) U.S. Cl.
CPC ............ *G06F 40/56* (2020.01); *G06F 40/103* (2020.01); *H04N 21/44* (2013.01); *H04N 21/84* (2013.01)

(58) Field of Classification Search
CPC ........ G06F 40/56; G06F 40/103; H04N 21/44
See application file for complete search history.

(56) References Cited

U.S. PATENT DOCUMENTS 9,883,252 B2 1/2018 Hall et al.
10,223,636 B2 3/2019 Reddy et al.
(Continued)

FOREIGN PATENT DOCUMENTS

WO 2007021277 2/2007

OTHER PUBLICATIONS

Zhu et al., ScriptWriter: Narrative-Guided Script Generation, Nov. 15, 2020.
(Continued)

*Primary Examiner* — Ibrahim Siddo
(74) *Attorney, Agent, or Firm* — Smart & Biggar LP

(57) ABSTRACT

A script production method and a show production system, in which a user has a script seed input that the user wishes to be the starting narrative or starting point for a video. In an example, the script production method includes: receiving the script seed input; generating, using the script seed input and a script writer module: a script which continues the narrative; generating, using the script and a script analysis module: respective segment metadata for the script; and generating, using the script, the respective segment metadata and one or more rendering modules: one or more video segments. An interface screen on a device can be used to add, edit, delete, or approve proposed script segments of the script in real-time after the video segments are generated, in which those approved proposed script segment are also generated into video segments which further continue the narrative.

52 Claims, 16 Drawing Sheets

(51) Int. Cl.
*H04N 21/44* (2011.01)
*H04N 21/84* (2011.01)

(56) References Cited

U.S. PATENT DOCUMENTS

| | | |
|---|---|---|
| 10,334,328 B1 | 6/2019 | Rosen et al. |
| 10,440,431 B1 | 10/2019 | Bulusu et al. |
| 10,733,230 B2 | 8/2020 | Jo |
| 10,789,755 B2 | 9/2020 | Amer et al. |
| 11,269,941 B2 | 3/2022 | Schriber et al. |
| 2013/0124984 A1* | 5/2013 | Kuspa ................ H04N 21/435 715/255 |
| 2015/0296228 A1* | 10/2015 | Chen ................ H04N 21/8126 725/34 |
| 2015/0370888 A1 | 12/2015 | Fonseca E Costa et al. |
| 2022/0076206 A1 | 3/2022 | Mactiernan et al. |

OTHER PUBLICATIONS

Andreas Butz, Anymation with CATHI, Jul. 31, 1997.
Shin et al., Roslingifier: Semi-Automated Storytelling for Animated Scatterplots, Dec. 31, 2022.

* cited by examiner

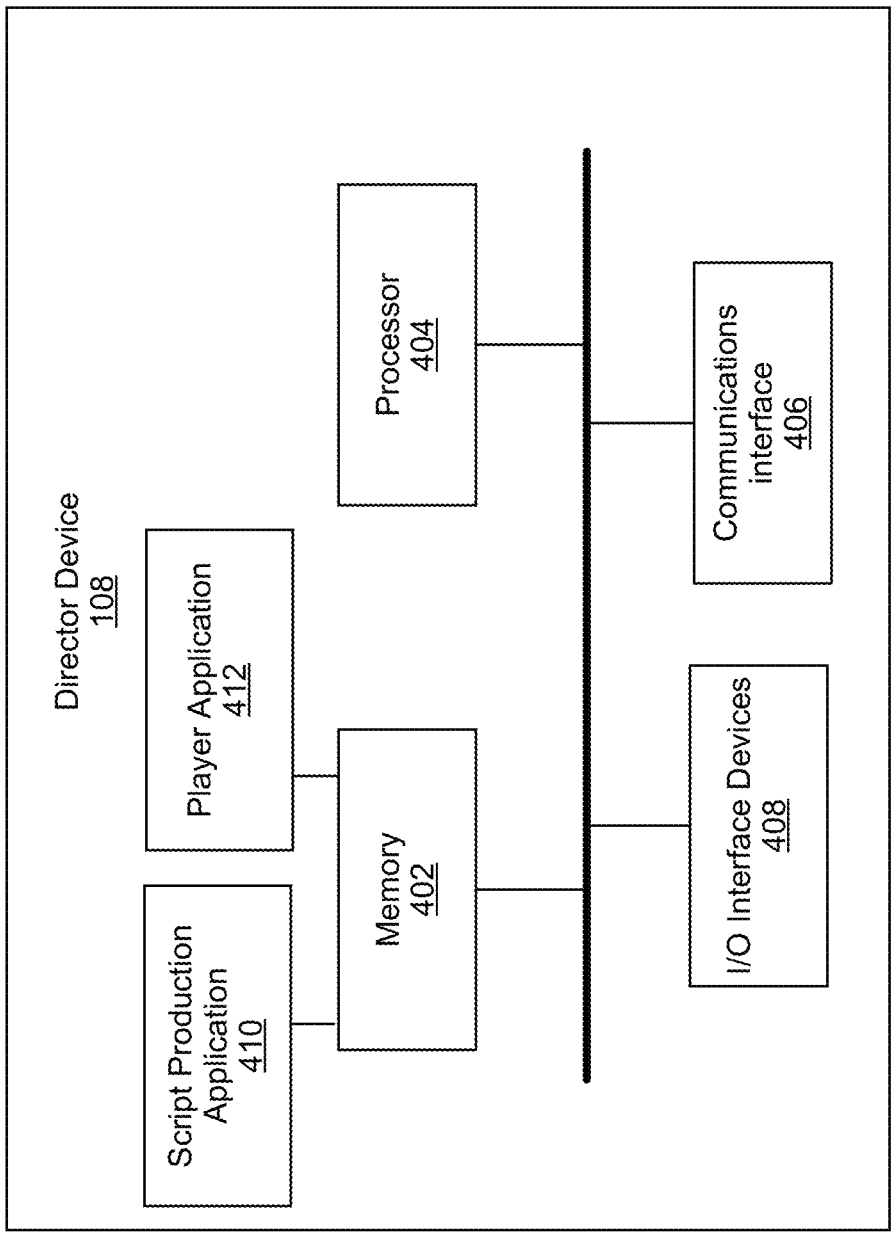

AUTOMATED NARRATIVE PRODUCTION SYSTEM AND SCRIPT PRODUCTION METHOD WITH REAL-TIME INTERACTIVE CHARACTERS

CROSS-REFERENCE

This application claims the benefit of U.S. Provisional Patent Application No. 63/220,442 filed Jul. 9, 2021, the entire contents of which are herein incorporated by reference.

TECHNICAL FIELD

Example embodiments relate to automated generation of real-time scripts and animation videos.

BACKGROUND

Video shows such as movies, television shows, online shows, narratives and animations can require large production studios. The production resources for a video show can include scriptwriters, directors, actors, crew, equipment, location sites, post-processing, and large time and financial resources. For animated video shows, high performance computers and skilled animators are also typically needed.

After a video show is produced, there may be reviews and audience feedback. In some instances, the video show cannot be easily changed after public release. In other instances, for example when a focus group is used, the same level of production resources may be required to adjust, rewrite and remake particular scenes of the video show. These changes need to be manually performed after receiving the reviews and audience feedback, which is slow and not in real-time. Conventional video production methods are therefore slow to respond to feedback from audiences.

Additional difficulties may be appreciated in view of the Detailed Description, herein below.

SUMMARY

It would be advantageous to have a show production system that can generate scripts and video shows in real-time.

It would be advantageous to have the show production system be dynamically adjustable based on director feedback, audience feedback, and machine learning models.

It would be advantageous to have the show production system that tailors content to the user's (or users') current state of engagement.

It would be advantageous to have the show production system that optimizes engagement over time and in real time.

It would be advantageous to have the show production system be dynamically adjustable based on a short feedback loop from user feedback.

Example embodiments relate to show production systems and script production methods for generating scripts and video shows in real-time. An example of the script production method can be applied to the scenario where a user has a script seed input that the user wishes to be the starting point for a video show. In response, the script production method uses one or more script production modules to dynamically generate and propose, in real-time, new script segments for a new script from the script seed input. The new script can include the same or different characters having phrases and stage directions that stem from the script seed input. The script production method uses the one or more script production modules to dynamically generate in real-time a new video from the script. The incremental nature of the script generation enables audiences and directors to influence the outcomes of the video show. Other enrichment data, audio enrichment data and visual enrichment data can be generated by the script production modules and incorporated into the new video.

In some example embodiments, the new video is streamed (live broadcast or live published) to the audience prior to completion of the script. For example, as each script is generated, those scripts can be generated into videos and streamed to the audience. Real-time feedback from the audience can be used for the script production method to generate new scripts. The script production method can, in real-time, propose potential new scripts. In some examples, the user can approve, edit or delete prior to the video for those scripts being generated and streamed. In some examples, the user can provide feedback on the video in real-time which is used to generate future proposed scripts that are used by the script production method to continue the generation of the video. The script production method can also generate multiple potential script segments (different narrative branches that continue the narrative) that can be selected, approved, edited or deleted by one or more of the users.

An example embodiment is a script production method, comprising: receiving a script seed input that represents a beginning of a narrative; generating, using the script seed input and a script writer module: a queue of one or more script segments of a script which continues the narrative; locking at least one of the script segments in the queue; generating, using one or more of the script segments and a script analysis module: respective script metadata for the one or more script segments of the script; generating, using the at least one of the script segments that are locked, the respective script metadata and one or more rendering modules: one or more video segments; and receiving feedback on one or more of the script segments in the queue that have not been locked.

In an example embodiment of any of the above script production methods, the script seed input includes: i) a phrase and a character to speak the phrase; and ii) a stage direction.

In an example embodiment of any of the above script production methods, the script seed input includes: i) a second phrase and a second character to speak the second phrase.

In an example embodiment of any of the above script production methods, the script seed input includes: a system signal.

In an example embodiment of any of the above script production methods, the system signal includes: adding a character, removing a character, an error signal, a scene change, an animation trigger, a sound effect trigger, ending a scene, a lighting cue, a camera cues, or ending a show.

In an example embodiment of any of the above script production methods, the script seed input includes: an input text, an input image, an input video, or an input audio of a spoken narrative.

In an example embodiment of any of the above script production methods, at least one of the script segments includes: a phrase and a character speaking the phrase; and wherein at least one of the script segments includes: a stage direction.

In an example embodiment of any of the above script production methods, at least one of the script segments includes: a system signal.

In an example embodiment of any of the above script production methods, the system signal includes: adding a character, removing a character, an error signal, a scene change, an animation trigger, a sound effect trigger, ending a scene, a lighting cue, a camera cues, or ending a show.

In an example embodiment of any of the above script production methods, the one or more script segments are each in a common script segment message format.

In an example embodiment of any of the above script production methods, the script writer module includes: a remote natural language processing (NLP) module; a local NLP module; a chat bot module; and/or a news bot module.

In an example embodiment of any of the above script production methods, the script analysis module includes: a sentiment module for generating sentiment metadata for the respective script metadata; a stage direction extraction module for generating a stage direction or stage direction metadata of the stage direction for the respective script metadata; a character extraction module for generating character metadata of a character action for the respective script metadata; and/or a scene direction module for generating scene direction metadata for the respective script metadata.

In an example embodiment of any of the above script production methods, the generating the respective script metadata includes generating processing metadata using the script and the script analysis module, wherein the processing metadata is for technical introspection of one or more states of the script production method, managing performance of the script production method, and managing timing of message delivery between the script writer module, the script analysis module, and the one or more rendering modules.

In an example embodiment of any of the above script production methods, the generating of the respective script metadata includes generating audio metadata using the script and the script analysis module, wherein the audio metadata includes audio duration and audio sampling rate, wherein the generating the one or more video segments uses the audio metadata.

In an example embodiment of any of the above script production methods, at least one of the rendering modules includes a speech rendering module which uses the script and the audio metadata for generating audio enriching data of speech for the generating the one or more video segments.

In an example embodiment of any of the above script production methods, at least one of the rendering modules includes a music scoring module which uses the script and the audio metadata for generating audio enriching data of music for the generating the one or more video segments.

In an example embodiment of any of the above script production methods, the generating the respective script metadata includes generating sentiment metadata using the script and the script analysis module, wherein the sentiment metadata includes sentiment data or emotion data, wherein the generating the one or more video segments uses the sentiment metadata.

In an example embodiment of any of the above script production methods, the generating the respective script metadata includes generating keyword metadata using the script and the script analysis module, wherein the keyword metadata includes at least one keyword extracted from a phrase of the script, wherein the at least one keyword is given higher weight by the script analysis module or one of the rendering modules, wherein the generating the one or more video segments uses the keyword metadata.

In an example embodiment of any of the above script production methods, the queue is generated in real-time as the at least one of the script segments are generated into the one or more video segments.

In an example embodiment of any of the above script production methods, the feedback includes an approval, an edit, or a deletion of at least one of the script segments in the queue.

In an example embodiment of any of the above script production methods, the feedback includes audience feedback from at least one device, and wherein the feedback includes director feedback from at least one of the devices.

In an example embodiment of any of the above script production methods, the generating the one or more video segments is generated from three way authorship of the script writer module, the director feedback, and the audience feedback.

In an example embodiment of any of the above script production methods, the method further includes storing the feedback, wherein the script writer module is configured to learn from the feedback.

In an example embodiment of any of the above script production methods, the one or more rendering modules include a back end rendering module and a front end rendering module, wherein the generating the one or more video segments includes: generating, using the script, the respective script metadata, and the back end rendering module: audio enriching data and visual enriching data; generating, using the audio enriching data, the visual enriching data, and the front end rendering module: the one or more video segments; and formatting, using the front end rendering module, the one or more video segments to a video format that is particular to a respective platform of one or more user devices.

In an example embodiment of any of the above script production methods, the back end rendering module includes an asset generation module.

In an example embodiment of any of the above script production methods, the asset generation module is configured to generate a character and/or an object in at least one the video segments.

In an example embodiment of any of the above script production methods, the method further includes receiving second feedback on the script metadata.

In an example embodiment of any of the above script production methods, the generating the script, the generating the respective script metadata, and the generating the one or more video segments are performed in real-time.

In an example embodiment of any of the above script production methods, the at least one of the script segments that have been generated into the one or more video segments are live published, wherein the receiving feedback is on one or more of the script segments in the queue that have not been live published.

In an example embodiment of any of the above script production methods, the at least one of the script segments that are locked are earlier in the queue and the one or more of the script segments in the queue that have not been locked are later in the queue.

In an example embodiment of any of the above script production methods, the generating the queue includes generating a plurality of different parallel queues each respectively having one or more of the script segments; further comprising receiving a selection of one of the parallel queues.

In an example embodiment of any of the above script production methods, the receiving feedback is on the queue that is selected.

In an example embodiment of any of the above script production methods, the selection of the queue is performed by an automated selection system In an example embodiment of any of the above script production methods, the automated selection system takes into account the script seed input or further script seed inputs in relation to a middle of the narrative for performing the selection.

In an example embodiment of any of the above script production methods, the automated selection system includes a machine learning model.

In an example embodiment of any of the above script production methods, the method further includes receiving one or more further script seed inputs in relation to a middle of the narrative, wherein the generating the queue further uses the further script seed inputs.

In an example embodiment of any of the above script production methods, the one or more further script seed inputs are manually generated, extracted from a show structure document, or automatically generated by the script writer module.

In an example embodiment of any of the above script production methods, the one or more further script seed inputs include a natural language description of a character or a scene.

Another example embodiment is a script production method, comprising: sending, to one or more script production modules, a script seed input that represents a beginning of a narrative; receiving, from the one or more script production modules, a queue of one or more script segments of a script which continue the narrative; receiving a locking of at least one of the script segments in the queue; receiving, from the one or more script production modules, one or more video segments that are generated from the at least one of the script segments that have been locked; and sending, to the one or more script production modules, an edit, a deletion, or an approval of at least one of the script segments in the queue that have not been locked.

In an example embodiment of any of the above script production methods, the receiving the queue includes receiving a plurality of different parallel queues each respectively having one or more of the script segments; further comprising receiving a selection of the queue as one of the parallel queues and sending the selection of the queue.

In an example embodiment of any of the above script production methods, the method further includes sending one or more further script seed inputs in relation to a middle of the narrative, wherein the queue is generated by the one or more script production modules using the further script seed inputs.

In an example embodiment of any of the above script production methods, the method further includes receiving, from the one or more script production modules, respective script metadata for at least one of the script segments; and sending, to the one or more script production modules, feedback on the respective script metadata for one or more of the script segments in the queue that have not been locked.

In an example embodiment of any of the above script production methods, the one or more video segments are generated from three way authorship of the one or more script production modules, director feedback, and audience feedback from one or more user devices.

In an example embodiment of any of the above script production methods, the method further includes displaying an interface screen which includes the one or more script segments in the queue, where the interface screen is configured to receive the edit, the deletion, the approval, or the addition of at least one of the script segments.

In an example embodiment of any of the above script production methods, the queue is displayed in real-time through the interface screen as further of the script segments are received from the one or more script production modules.

In an example embodiment of any of the above script production methods, the receiving the one or more video segments of the at least one of the script segments are live published, wherein the sending the edit, the deletion, or the approval is on one or more of the script segments in the queue that have not been live published.

In an example embodiment of any of the above script production methods, the at least one of the script segments that are locked are earlier in the queue and the one or more of the script segments in the queue that have not been locked are later in the queue.

An advantage of the script production method is that videos can be automatically dynamically generated in real-time from the script seed input.

An advantage of the script production method is that costly production studios are not required and production time is reduced.

An advantage of the script production method is that the videos can be automatically dynamically generated in real-time based on real-time feedback from users.

An advantage of the script production method is that machine learning can be used to automatically generate videos from the script seed input.

Another example embodiment is a show production system, including: at least one processor; and memory containing instructions which, when executed by the at least one processor, cause the processor to perform the script production method of any of the above.

Another example embodiment is a non-transitory memory containing instructions which, when executed by at least one processor, cause the at least one processor to perform the script production method of any of the above.

BRIEF DESCRIPTION OF THE DRAWINGS

Reference will now be made, by way of example, to the accompanying drawings which show example embodiments, and in which:

FIG. 4 illustrates a block diagram of a director device for the show production system of FIG. 1, in accordance with an example embodiment;

FIG. 8 illustrates an example video generated from the example interface screen of FIGS. 7A and 7B, in accordance with an example embodiment.

Similar reference numerals may have been used in different figures to denote similar components.

DETAILED DESCRIPTION

Figure 1:
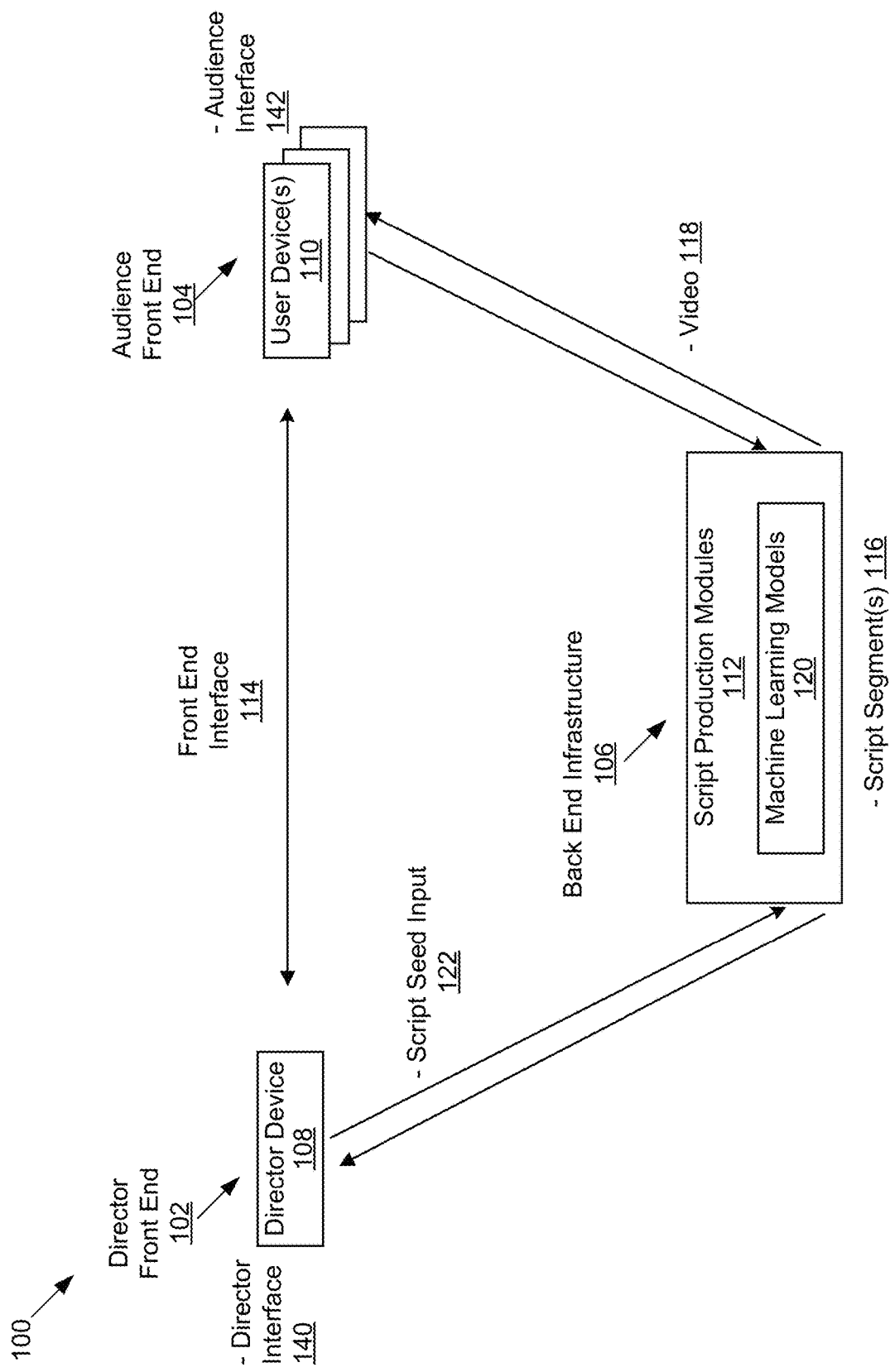
FIG. 1 illustrates a block diagram of an example show production system and script production method, in accordance with an example embodiment.

Example embodiments relate to an end-to-end show production system and script production method for the automatic generation of a character-driven narrative, powered by machine learning (ML), artificial intelligence (AI), and natural language processing (NLP). Audiences can interact with these narratives in real-time through a variety of media, including audio and visual channels. In doing so, the show production system enables co-creation between machine and users for dynamic authorship and storytelling, resulting in increased audience engagement and uniquely produced video shows. The show production system can be used to generate content rich video that goes beyond a simple static character with a moving mouth.

Example embodiments relate to show production systems and script production methods for generating scripts and video shows in real-time. An example of the script production method can be applied to the scenario where a user has a script seed input that the user wishes to be the starting point for a video show. In response, the script production method uses one or more script production modules to dynamically generate in real-time new script segments for a new script from the script seed input. The new script can include the same or different characters having phrases and stage directions that stem from the script seed input. The script production method uses the one or more script production modules to dynamically generate in real-time a new video from the script. The incremental nature of the script generation enables audiences and directors to influence the outcomes of the video show. Other enrichment data, audio enrichment data and visual enrichment data can be generated by the script production modules and incorporated into the new video.

In some example embodiments, the new video is streamed (live broadcast or live published) to the audience prior to completion of the script. For example, as each script is generated, those scripts can be generated into videos and streamed to the audience. Real-time feedback from the audience can be used for the script production method to generate new scripts. The script production method can, in real-time, propose potential new scripts. In some examples, the user can approve, edit or delete prior to the video for those scripts being generated and streamed. In some examples, the user can provide feedback on the video in real-time which is used to generate future proposed scripts that are used by the script production method to continue the generation of the video. The script production method can also generate multiple potential script segments (different narrative branches that continue the narrative) that can be selected, approved, edited or deleted by one or more of the users.

An example embodiment is a script production method, comprising: receiving a script seed input that represents a beginning of a narrative; generating, using the script seed input and a script writer module: a queue of one or more script segments of a script which continues the narrative; locking at least one of the script segments in the queue; generating, using one or more of the script segments and a script analysis module: respective script metadata for the one or more script segments of the script; generating, using the at least one of the script segments that are locked, the respective script metadata and one or more rendering modules: one or more video segments; and receiving feedback on one or more of the script segments in the queue that have not been locked.

Another example embodiment is a script production method, comprising: sending, to one or more script production modules, a script seed input that represents a beginning of a narrative; receiving, from the one or more script production modules, a queue of one or more script segments of a script which continue the narrative; receiving a locking of at least one of the script segments in the queue; receiving, from the one or more script production modules, one or more video segments that are generated from the at least one of the script segments that have been locked; and sending, to the one or more script production modules, an edit, a deletion, or an approval of at least one of the script segments in the queue that have not been locked.

FIG. 1 illustrates an example show production system 100 (also called narrative production system) and script production method, in accordance with an example embodiment. An example of the show production system 100 can be applied to the scenario where a user has a script seed input 122 that the user wishes to be the starting narrative or starting point for a video show (video 118). In response, the script production method uses one or more script production modules 112 to dynamically generate in real-time a new script from the script seed input 122. The new script can include different characters having phrases and stage directions that stem from the script seed input 122. A phrase is what is to be spoken by a character. A stage direction is a description of what is to happen with one or more of the characters (e.g. movement, position, or tone), objects, background, or other enrichment of the video 118. The script production method uses the one or more script production modules 112 to dynamically, incrementally, and iteratively generate in real-time the new video 118 from the new script. Other video enriching data, such as audio enrichment data and visual enrichment data can be generated by the script production modules 112 and incorporated into the new video 118.

As shown in FIG. 1, the show production system 100 can include: a director front end 102 including a director device 108 having a director interface 140; an audience front end 104 including one or more user devices 110 (each or collectively 110) each having an audience interface 142; and a back end infrastructure 106. The director device 108 is operated by a director in some examples. In other examples, the functions of the director device 108 are automatically performed and a director is not needed. A user device 110 is operated by an audience member in some examples. The back end infrastructure 106 includes script production modules 112. The back end infrastructure 106 and the script production modules 112 can include machine learning models 120 (each or collectively 120), as well as manual input functions or rules based functions. The script production modules 112 are configured to perform script production functions. At least one of the script production modules 112 are configured to generate, from the script seed input 122, one or more script segments 116 (each or collectively 116). For example, new dialogue (phrases) are generated by the script production modules 112 for the characters to speak. For example, new stage directions are generated by the script production modules 112. The script includes one or more script segments 116, which can be sequential. The script can also be referred to as a screenplay.

At least one of the script production modules 112 are configured to generate, from each of the script segments 116: the video 118. The back end infrastructure 106 sends the video 118 to the user devices 110, who can provide real-time feedback to the script production modules 112. The back end infrastructure 106 also sends the video 118 to the director devices 108 who can provide real-time feedback to the script production modules 112. The real-time feedback can be used by the script production modules 112 to generate new script segments 116, which can include new dialogue and/or scene directions and in turn generate new video 118.

In some examples, at least one of the script production modules 112 are configured to generate, from the script segments 116, metadata containing video enriching data so that the characters and setting are more dynamic. The metadata can also be rules based or manually input. The video 118 is generated taking into account the additional metadata and the video enriching data.

In an example, the director device 108 and the user devices 110 communicate over a front end interface 114. The director device 108, the user devices 110, and the script production modules 112 therefore collaborate to generate the script segments 116 and the video 118, which can be denoted 3-way authorship. In an example, the director device 108 can receive feedback from the user devices 110, and then the director device 108 is the ultimate decider on whether a script segment 116 on the back end infrastructure 106 is approved to be generated into a video 118.

In other examples (not shown), the director device 108 and the user devices 110 communicate through the back end infrastructure 106 or through other platforms or servers. In some examples, the director device 108 and the user devices 110 communicate through messaging platforms, audioconference platforms or videoconference platforms.

In some example embodiments, the generated video 118 is streamed (live broadcast or live published) to the audience front end 104 prior to generating a completed script. For example, one or more script segments 116 are generated at a time. As script segments 116 are streamed to the audience front end 104, real-time feedback from the user devices 110 and the director device 108 can be used for the script production method to generate new script segments 116. The script production method can, in real-time, propose potential new script segments 116, to which the director device 108 can approve, edit or delete prior to the video 118 for those script segments 116 being generated and streamed. In some examples, the script and the video 118 do not necessarily end to completion, and can be continuously streaming indefinitely, e.g. autonomously or based on continuous real-time engagement with audience members and/or the director.

In some examples, not shown, there is more than one director device 108 whom can collaborate on directing the video 118. In some examples, there is no director device 108. For example, the script production modules 112 can be left to run autonomously and automatically after receiving the script seed input 122. In some examples, the script production modules 112 can receive feedback directly from the user devices 110 of the audience front end 104 in the absence of the director device 108, and the video 118 is generated from audience feedback, voting, consensus, one or a particular subset of user devices 110, etc. In some examples, any one the user devices 110 can be designated as the director device 108, and the user of that user device 110 is the director.

Figure 2:
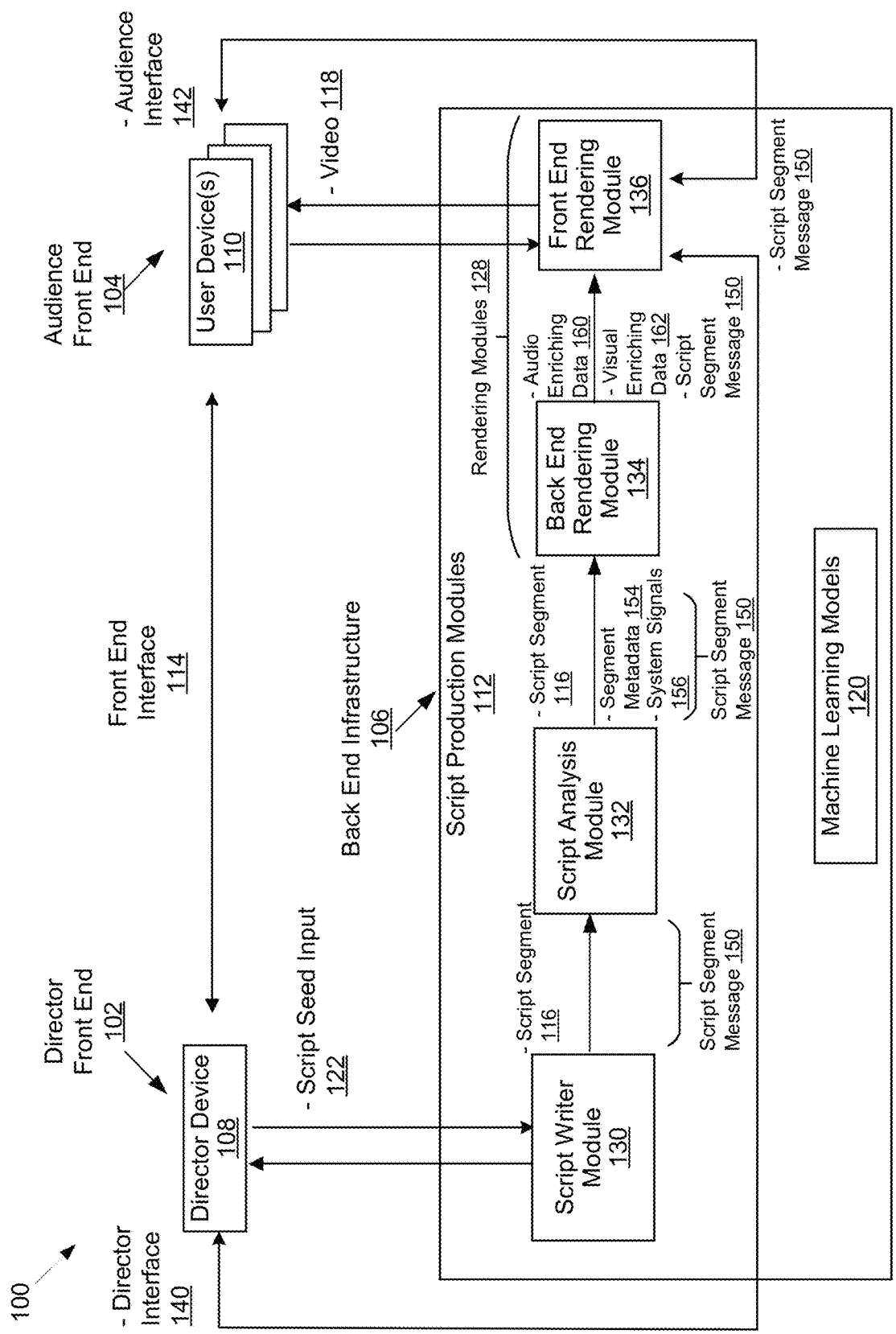
FIG. 2 illustrates a detailed block diagram of the show production system of FIG. 1, in accordance with an example embodiment.

FIG. 2 illustrates the show production system 100 in greater detail. The show production system 100 is configured to perform the script production method, and incrementally and iteratively generate a video show based on real-time user feedback. The script production modules 112 include a script writer module 130, a script analysis module 132, and one or more rendering modules 128 including a back end rendering module 134 and a front end rendering module 136.

Figure 6:
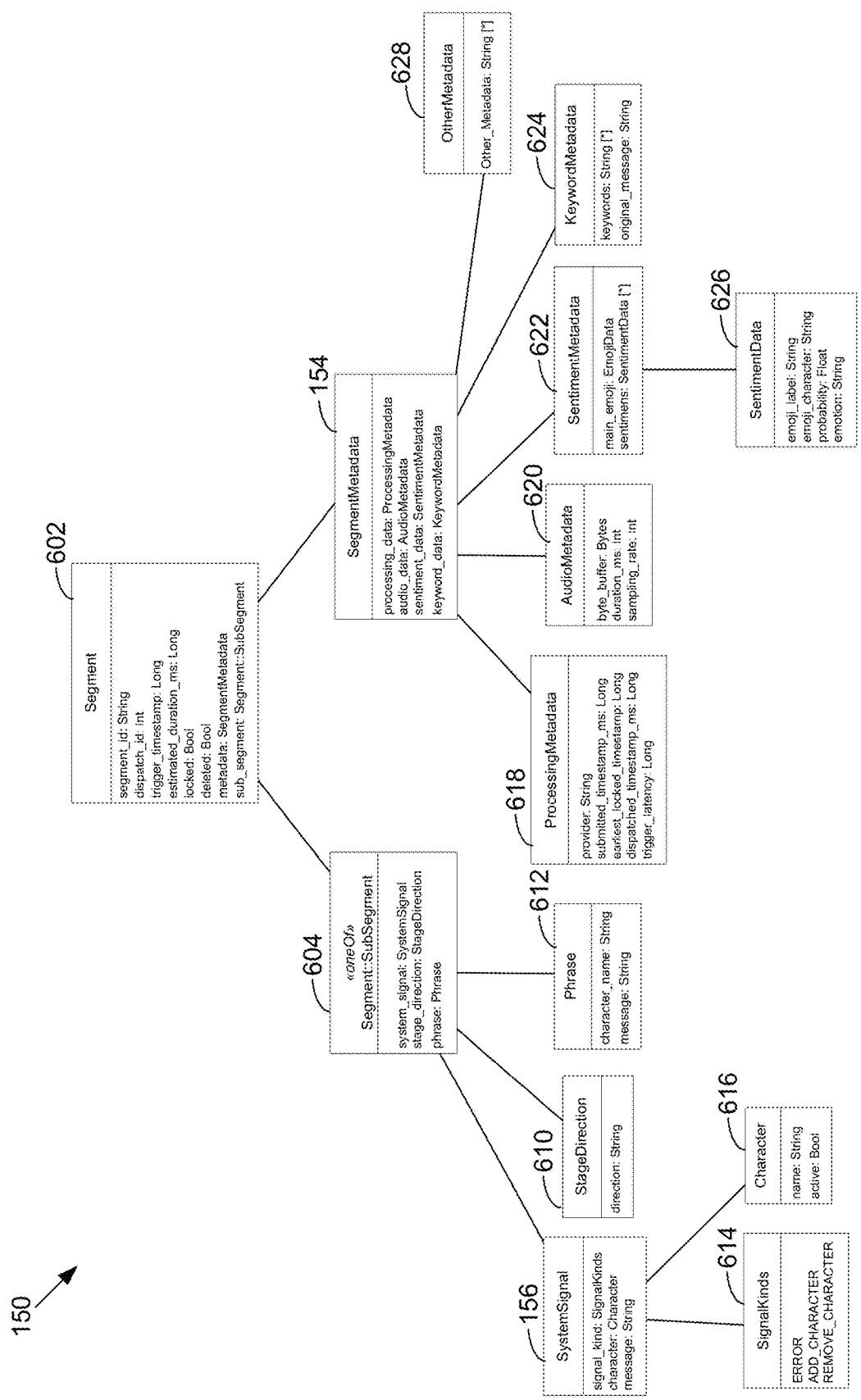
FIG. 6 illustrates an example message format of a script segment message for the show production system of FIG. 1, in accordance with an example embodiment.

The script production modules 112 can communicate using script segment messages 150 (each or collectively 150). A detailed example message format of the script segment messages 150 is illustrated in FIG. 6. Each script segment message 150 represents a script segment 116, such as a scene direction or a phrase (including the character who is speaking the phrase). Each script segment message 150 can be used to generate a respective video segment of the video 118. The script segment message 150 can be transmitted or otherwise accessed between the script production modules 112. In some examples, the script segment message 150 contains information that can be used by the rendering modules 128 to generate the video segment of the video 118.

In an example scenario of the script production method, the director device 108 transmits a script seed input 122 to the script writer module 130. The script seed input 122 can be based on feedback from the director (through the director interface 140) and the user devices 110. The script seed input 122 represents a beginning of a narrative, for example, the script seed input 122 starts a narrative or show that is desired by the director to be the starting point for generating a new video 118. The narrative is a human-understandable scene in some examples, which have a narrative structure familiar to the audience that stems from the script seed input.

In some examples, the script seed input 122 is already in the format of the script segment message 150 from the director device 108 and includes script segments 116. In some examples, the script writer module 130 preprocesses and converts the received script seed input 122 into one or more script segments 116. The script segment 116 can include a stage direction and/or a phrase (including the character speaking the phrase). In an example of the script segment message 150, the script segment 116 can be one of: a stage direction, a phrase (including character) or a system signal 156.

The script writer module 130 generates, using the script seed input 122, one or more new script segments 116 that continue the narrative and stem from the script seed input 122. As more script segments 116 are generated, the script writer module 130 generates more screen segments 116 based on the script seed input 122 and all previous pending or approved screen segments 116.

The script analysis module 132 generates, using the script segments 116 from the script writer module 130, segment metadata 154 (also referred to as a script metadata) and system signals 156. The segment metadata 154 is content and video enriching data based on text analysis of the script segments 116, and can include sentiment data, music data, voice data, and other data. The system signals 156 can be data extracted from the text of the script segments 116 or can be received from the director device 108. The script analysis module 132 can generate a new script segment message 150 which contains the system signal 156. In some examples, the system signals 156 are based on manual input from the director interface 140 or the audience interface 142. The system signals 156 can include adding a character, removing a character, or error. In examples, the system signals 156 can include scene change, animation triggers, sound effect triggers, ending a scene, lighting cues, camera cues, ending a show, etc.

The back end rendering module 134 receives the script segment messages 150, which can include the script segment 116, the segment metadata 154, and/or the system signals 156. The back end rendering module 134 generates, from one or more of the script segment messages 150, video enriching data which can include audio enriching data 160 and/or visual enriching data 162. The back end rendering module 134 can also pass through the script segment message 150 to the front end rendering module 136.

The front end rendering module 136 generates (renders), using the audio enriching data 160 and the visual enriching data 162 in relation to one or more script segment messages 150, the video 118 (including one or more video segments). The front end rendering module 136 renders the video 118. In an example, the front end rendering module 136 uses conventional gaming engine rendering software and does not use machine learning. In examples, the video 118 can be in a variety of formats. In examples, the front end rendering module 136 formats the video 118 into a particular platform or video player that is being used by the user devices 110 and the director device 108. The front end rendering module 136 can transmit a customized format of the video 118 to one or a group of the user devices 110. Different customized formats of the video 118 can be generated at the same time by the front end rendering module 136. The front end rendering module 136 can also customize the particular resolution depending on the user device 110, for example standard definition, High Definition (HD), or 4K, etc.

In some examples, the front end rendering module 136 is in the user device 110 and can render the video 118 based on the video enrichment data generated by the back end rendering module 134. The user device 110 renders the video 118 to a format suitable for the particular device capabilities, platform or video player of that user device 110.

As shown in FIG. 2, the script segment message 150 can be sent (passed through) from the front end rendering module 136 to both the director interface 140 of the director device 108 and to the audience interface 142 of the user device 110. The script segment message 150 can be a proposed script segment message 150 that contains proposed scene direction, proposed phrase (including proposed character to speak the proposed phrase) or proposed system signals 156. Based on feedback received through the director interface 140 or the audience interface 142, the director device 108 can edit, add, or approve any of the fields of the proposed script segment message 150 to the script writer module 130. Therefore, creation of the script and the video show is performed incrementally from real-time feedback from the users (director and audience).

In some examples, any of the script production modules 112 in the back end infrastructure 106 can run irrespective of the presence of other script production modules 112. Without the other script production modules 112, the back end infrastructure 106 can serve as a simple message passing server to pass the script segment messages 150 between the script production modules 112 with suitable constraints.

In some examples, not shown, a moderator is assigned the role of moderator functions such as filtering unwanted or explicit content. The moderator can be an audience member of the user device 110 or the director device 108, who performs manual filtering, censoring, commenting, blocking users, and/or editing of user feedback and proposed script segments 116. In some examples, not shown, the moderator function is performed autonomously by one or more machine learning models 120. In some examples, not shown, the moderator function is performed autonomously by moderator rules such as those set by gaming rating systems or media rating systems. The moderator function can include blacklist of explicit content, such as phrases, screen directions, narratives, and the visual enriching data 162. In an example, the director is the moderator. The moderator function can include whitelist of permitted content, phrases, visual enriching data 162. In an example, at least one of the audience members in the audience front end 104 is the moderator.

Figure 3A:
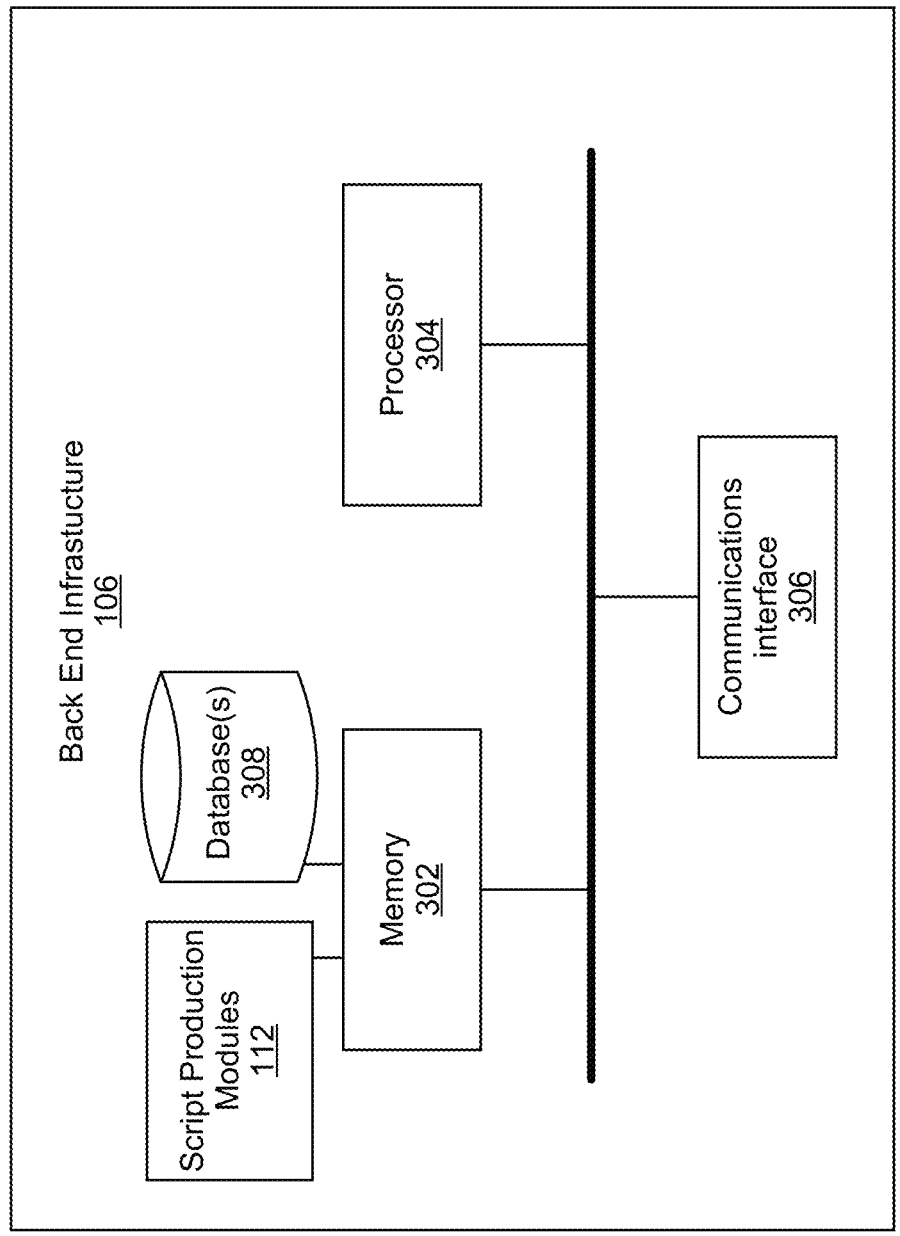
FIG. 3A illustrates a block diagram of a back end infrastructure for the show production system of FIG. 1, in accordance with an example embodiment.
Figure 3B:
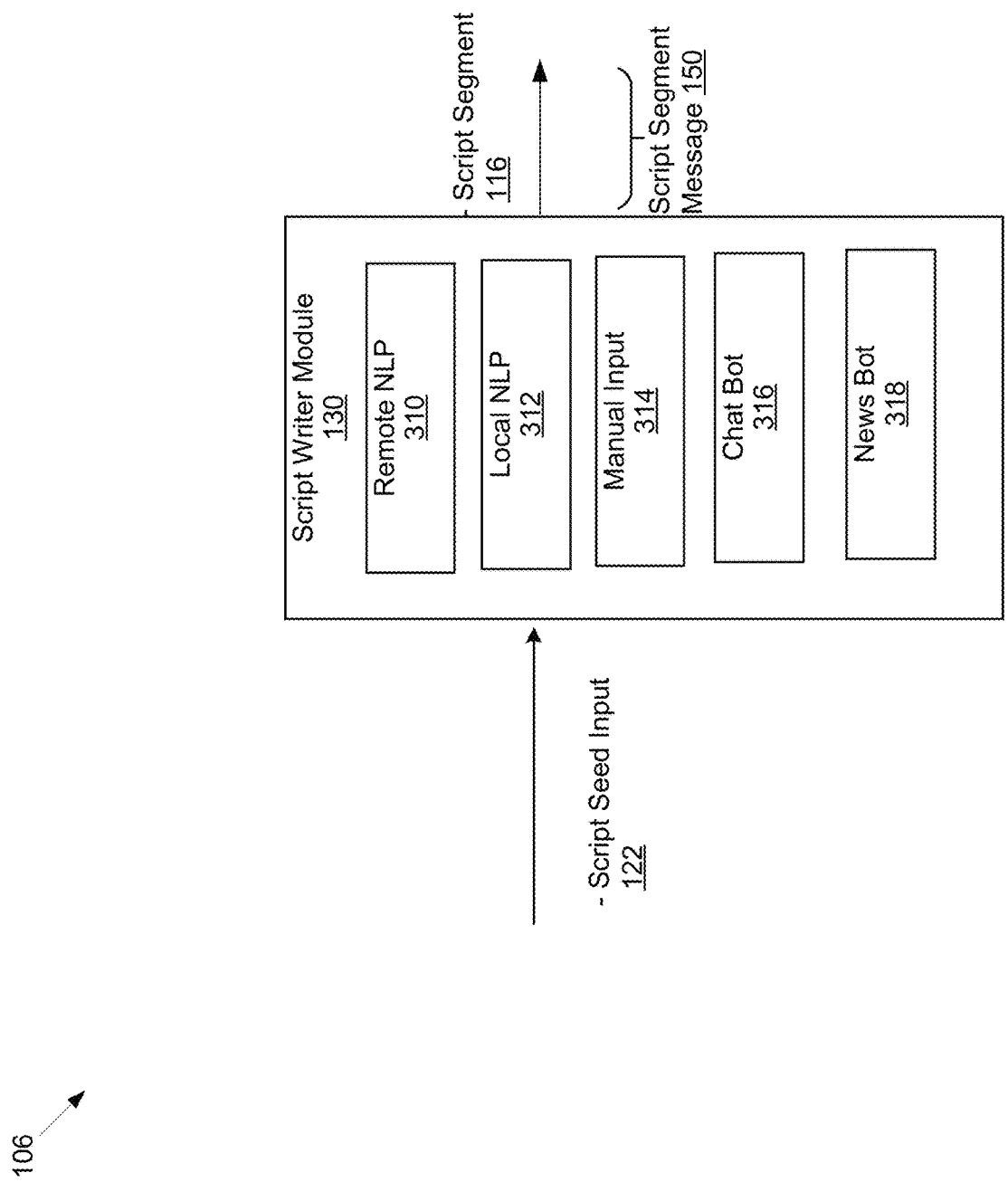
FIG. 3B illustrates a detailed block diagram of a script writer module of the back end infrastructure of FIG. 3A, in accordance with an example embodiment.

Details of the back end infrastructure 106 are illustrated in FIGS. 3A-3D. FIG. 3B illustrates a detailed block diagram of the script writer module 130, in accordance with an example embodiment. In an example, the script writer module 130 is a script writer model that includes one or more neural networks. In an example, the script segment 116 can be generated by the script writer module 130 using the script seed input 122 and all previous screen segments 116 that are either in progress or those that were finalized (e.g., approved by the director or rendered into the video 118). The script writer module 130 can be a stand alone module in which the final output is a script (or script segments 116) that is used for other purposes such as conventional show production, script publication, etc.

In an example, the script writer module 130 is a text generator that includes a NLP model. The script writer module 130 is configured to render the current scene, phrases and actions in a format amenable to the script analysis module 132 or the other script production modules 112, for example each phrase or stage direction is generated in a message format of the script segment message 150. The script writer module 130 can be configured to append, correct or remove script segments 116 from the scene. The script writer module 130 uses director inputs and can continue generating script segments 116 if left unattended (if so desired). In an example, the back end infrastructure includes multiple script writer modules 130 connected at the same time, allowing each to represent a specific character.

NLP refers to a branch of computer science and AI for giving computers the ability to understand text and spoken words in much the same way human beings can. NLP combines computational linguistics, rule-based modeling of human language, with statistical, machine learning, and deep learning models. NLP includes identifying language features such as grammar, sentences, nouns, adjectives, and verbs. NLP includes normalization of whitespace, punctuation, and spelling. NLP includes splitting long messages into sentences so sentiment analysis is more granular. NLP enables computers to process human language in the form of text or voice data and to understand the full meaning, to generate the intent and sentiment for the script or character. NLP drives computer programs that translate text from one language to another, respond to spoken commands, and summarize large volumes of text rapidly.

An example of the script writer module 130 includes remote NLP 310 (e.g. GPT-3, Lamda) which uses a remote application programming interface (API) call to call into for example, OpenAI's API to generate text in the given format. An example of the script writer module 130 includes local NLP 312 (e.g. GPT-2, GPT-J) which uses a local processing device to run inference on a modern language model. An example of the script writer module 130 includes manual input module 314, e.g. a human scriptwriter, which is run based on manual input without an automatic text generator. An example of the script writer module 130 includes a chat bot module 316 that includes a character that is driven by programmed logic to have certain responses. An examples of the script writer module 130 includes a news bot module 318 in which a character says phrases that are guided from news (e.g. newswires, Associated Press™ or Google™ News) or social media (e.g. Facebook™ or Twitter™).

Figure 3C:
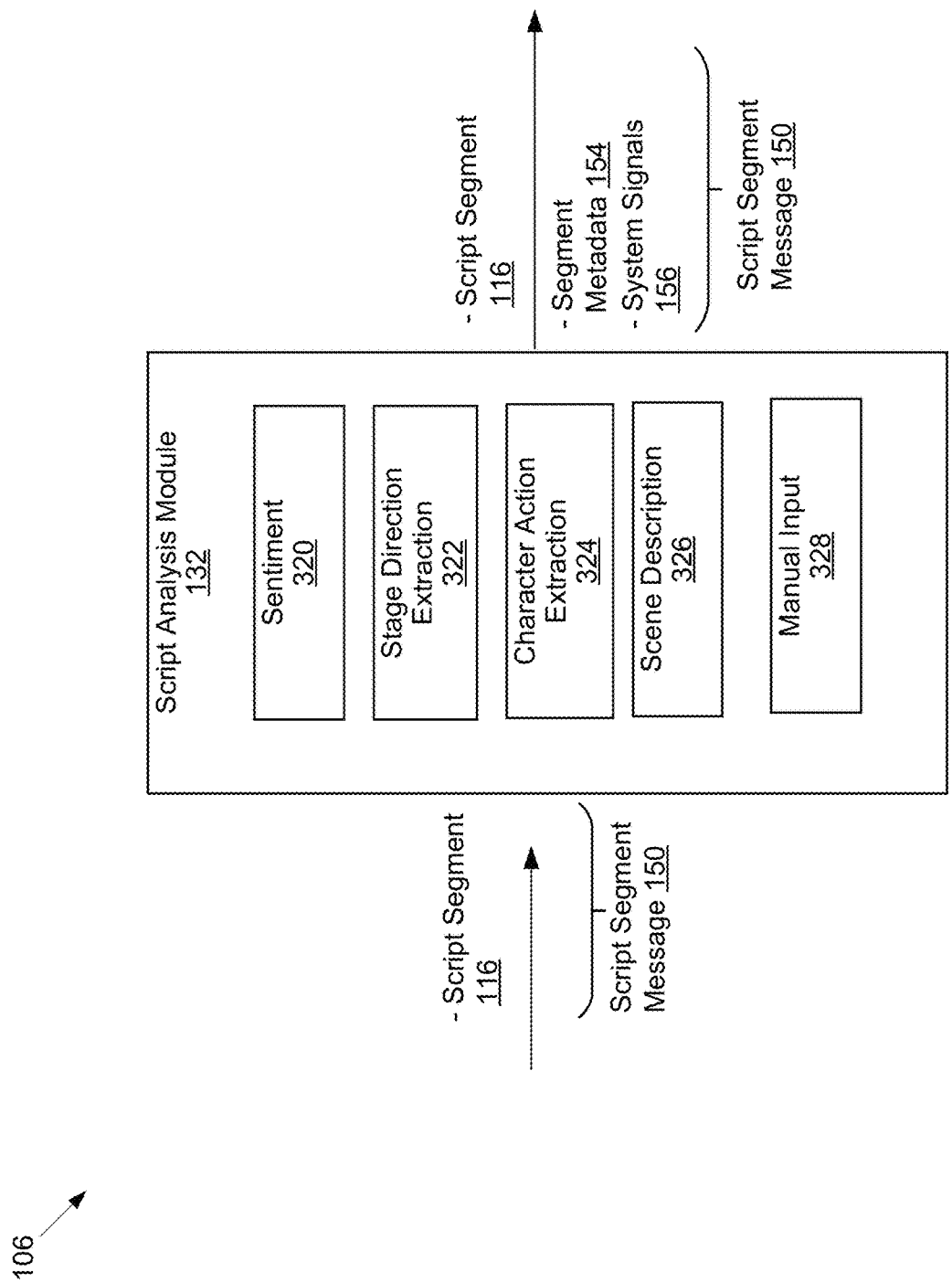
FIG. 3C illustrates a detailed block diagram of a script analysis module of the back end infrastructure of FIG. 3A, in accordance with an example embodiment.

FIG. 3C illustrates a detailed block diagram of the script analysis module 132, in accordance with an example embodiment. In an example, the script analysis module 132 is a script analysis model that includes one or more neural networks. The script analysis module 132 can be a stand alone module in which the input is any script (or script segments 116) which can be manually entered by the director or automatically generated by the script writer module 130. The final output from the script analysis module 132 can be enriched data such as the segment metadata 154 or the system signals 156.

In an example, the script analysis module 132 inspects the current text of the script segments 116 and analyzes the text for enriching directorial content. This enriching directorial content can include emotion data (emotional qualities) and action logic that can be used by the other script production modules 112 in their functions. The script analysis module 132 appends segment metadata 154 to the script segments 116, for example using the message format of the script segment message 150. The script analysis module 132 can generate one or more system signals 156 based on inspection of the text. In some examples, the system signal 156 is received from the director device 108 or one of the user devices 110. The system signal 156 can be used as a medium through which the director devices 108, the user devices 110 and the script production modules 112 communicate the system signal 156 for particular messages.

An example of the script analysis module 132 includes a sentiment module 320 such as Deepmoji from MIT™, which provides sentiment analysis in the form of emoji tied to specific sections of the text. Sentiment data (or metadata) can be extracted by scanning of the phrases (and sometimes from the stage directions) to be spoken by a character to determine the emotions that the character is most likely feeling at the time. An example of the script analysis module 132 includes a stage direction extraction module 322, in which script segments 116 contain stage direction 610 (FIG. 6) that is not meant to be spoken, but rather read by a director (or audience). The stage direction 610 contains information that influences the stage direction of the scene (one or more script segments 116). The stage direction extraction module 322 removes any stage direction that could be mistaken as phrase and adds as segment metadata 154, or generates a new script segment 116 containing the stage direction 610 (FIG. 6). An example of the script analysis module 132 includes a character action extraction module 324, which infers possible physical actions that a character may take given context of the script segments 116 or the constraints set up by the director. An example of the script analysis module 132 includes a scene description module 326, which extracts scene description about the physical layout of the scene, such as set and environment. The scene description can include location, furniture, props, time of day, blocking, etc. An example of the script analysis module 132 includes a manual input module 328, e.g. a human director, in which the human director provides manual interpretation of the script segments 116.

Figure 3D:
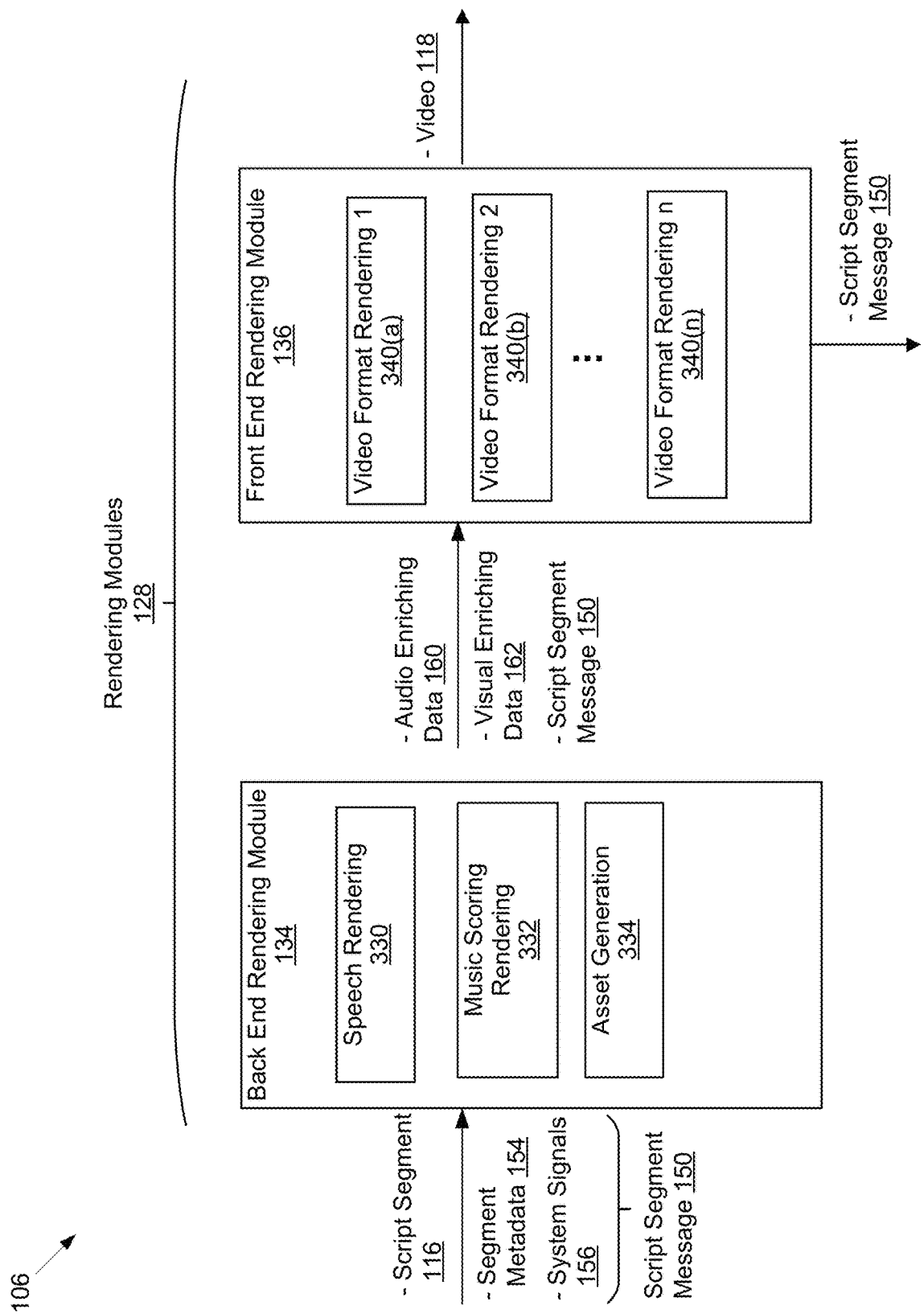
FIG. 3D illustrates a detailed block diagram of rendering modules of the back end infrastructure of FIG. 3A, in accordance with an example embodiment.

FIG. 3D illustrates a detailed block diagram of the rendering modules 128, including the back end rendering module 134 and the front end rendering module 136, in accordance with an example embodiment. In an example, the back end rendering module 134 is a back end rendering model which includes one or more neural networks. In an example, the back end rendering module 134 and the front end rendering module 136 are discrete entities with distinct workflows. In an example, the back end rendering module 134 operates asynchronously while the front end rendering module 136 operates in real-time. The rendering modules 128 can operate independently from the other script production modules 112, in which the input to the back end rendering module 134 is any script (or script segments), segment metadata 154 and/or system signals 156. For example, the back end rendering module 134 can receive a script segment message 150 which includes information to be rendered into the video 118. The script segment message 150 can be manually input (created) by the director device 108 in some examples, or can be generated by the script analysis module 132. In response to receiving the script segment message 150, the back end rendering module 134 generates the audio enriching data 160 and the visual enriching data 162, and the front end rendering module 136 generates the video 118 (one or more video segments corresponding to one or more script segments 116).

In an example, the back end rendering module 134 includes any or all of: i) one or more speech rendering modules 330, ii) one or more music scoring modules 332; and/or iii) one or more asset generation modules 334.

The speech rendering module 330 can render voice from text using the emotional cues, for example from the sentiment metadata 622 (FIG. 6). An example speech rendering module includes posterior-sampling style transfer using NVIDIA™ Tacotron2. An example speech rendering module 330 includes online Speech-To-Text APIs such as Replica and Azure. An example speech rendering module 330 includes real-time human voice acting through a web application.

The music scoring rendering module 332 can provide a background track to accentuate the dramatic action in the scene. An example music scoring rendering module 332 includes a music selection engine which searches a library of music to play in view of the segment metadata 154 or with certain segment conditions. An example music scoring rendering module 332 includes an AI music generator which uses emotional parameters in the sentiment metadata 622

(FIG. 6) in the scene to generate music. An example music scoring rendering module 332 includes a human equivalent of a musician or disc jockey (DJ) live-streaming.

The asset generation module 334 embeds visual elements that can be used by the rendering modules 128 to enhance the video 118 and the overall experience. Examples of the asset generation module 334 include: image generator using neural techniques, an image search plugin, and/or 3D asset generation. The asset can be one of the characters or an object in the scene (script segment 116).

The asset generation module 334 can be configured to generate 3D objects and 3D avatars (for the characters), and background scenes.

The asset generation module 334 can include a character builder that is configurable from a set of components or textual descriptions. When the same character name is used (e.g. Dwayne in examples herein), the same asset is used.

The asset generation module 334 can include a scene builder that is configurable based on background, entities (scene items), and other data. The asset generation module 334 can use textual descriptions of each scene/character component, in which the language models assemble a scene that matches the setting and character components (inside seeds). The asset generation module 334 can receive a scene description to generate the scene, e.g., receiving free-form textual description of a setting in which a story would occur. The asset generation module 334 can receive a character description, e.g. a free-form textual description of a character (humanoid/non-humanoid) that takes part in a narrative. The asset generation module 334 can receive scene or character descriptions which define how each with appear as well as how they will be understood by the language models involved in the narrative construction.

In an example, a character may change shirt color, hair style, expression, age, etc. In an example, an object may change, grow, shrink, change shape, explode, etc. The asset generation module 334 can also repurpose or revise an existing asset when appropriate.

In an example, the front end rendering module 136 is an audiovisual front-end plugin that can be rendered to a particular format for sharing e.g. automated podcast, Unity game engine, web browser. For example, the front end rendering module 136 can include video format rendering module 1 (340(a)), video format rendering module 2 (340(b)), . . . , video format rendering module n (340(n)), which are each used to render different video formats. In an example, the video 118 generated by the front end rendering module 136 can include a plurality of video frames (images). The video 118 can comprise one or more video segments (which is a different concept than a video frame). Each video segment corresponds to a script segment 116. The video segments can be sequential. Example formats of the video 118 include video files, video streaming (e.g. Moving Picture Experts Group 2, MPEG2), PNG sequences, stereoscopic (also known as three dimensional) video, equirectangular video, depth-augmented video, Virtual Reality (VR), Augment Reality (AR), three dimensional (3D) environments, voxel-based environments, gaming engine data, although the system is not limited to these formats. The video 118 can be live broadcast (live published) in real-time as video segments are generated (and locked). For example, the user device 110 can select a particular point of view in a 3D environment in order to view the video 118. In an example, the visual enriching data 162 can include closed captioning for the hearing impaired which displays the particular phrase and/or stage direction from the script segments 116. The audio enriching data 160 can include stereophonic audio data (e.g. left and right, or in some examples further spatial audio data such as Dolby™). The audio enriching data 160 can include descriptive audio for the visually impaired, which can be extracted from the stage direction or other fields of the script segment message 150. In some examples, an additional "character" indicated in the script segment message 150 can be "voiceover" or "God", which is rendered as audio enriching data 160 without any visual enriching data 162. When the voiceover is from a particular character, the same voice and tone as that character is audio rendered by the front end rendering module 136.

In an example, the front end rendering module 136 (or another script production module 112) can inspect the queue of approved script segments 116 that are not yet rendered and pace the contents of the video 118 accordingly. For example, if the number of approved script segments 116 is below a first threshold, the front end rendering module 136 can make the characters speak slower, add pauses, or add intervening character or scene actions. For example, if the number of approved script segments 116 is above a second threshold, the front end rendering module 136 can make the characters speak faster, or speed up character or scene actions. If the number of approved script segments 116 is between the first threshold and the second threshold, the front end rendering module 136 can render the action in the video 118 at normal pace. The number of approved script segments 116 in the queue, or a suitable flag (e.g., fast, normal, slow) can be a system signal 156 or other segment metadata 154.

Figure 7A:
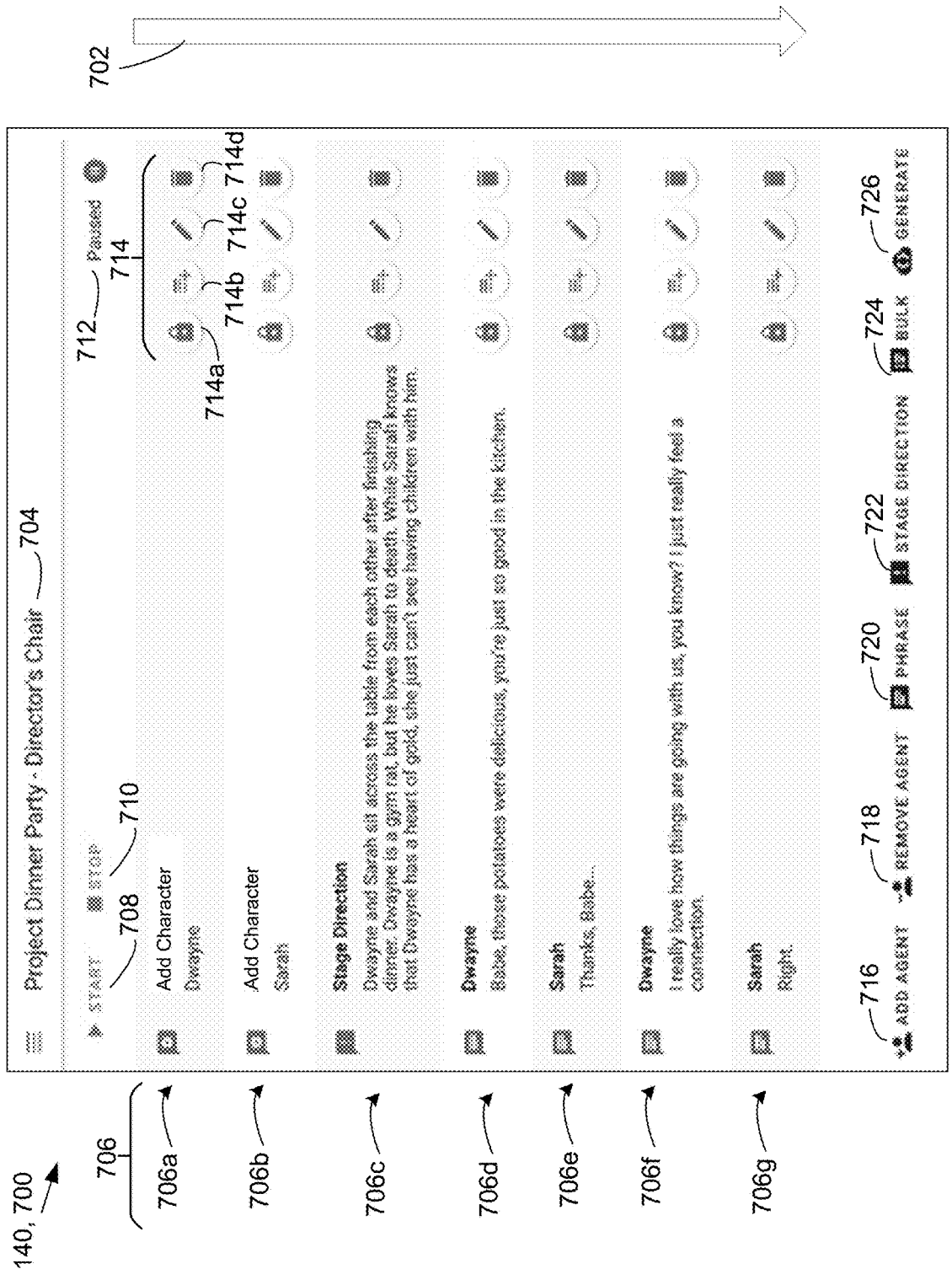
FIG. 7A illustrates an example interface screen for the director device of FIG. 4 to display and edit script segments, in accordance with an example embodiment.

The script seed input 122 will now be described in greater detail. In an example, the script seed input 122 is in the format of one or more script segment messages 150 and sent to the script writer module 130. In an example, the script seed input 122 can be in the format of a script, which can be converted to one or more script segments 116. For the script seed input 122, the director can insert various phrases (with characters), scene directions in natural language, or system signals 156 such as adding or removing characters. An example of the script seed input 122 in the format of a script is shown in FIG. 7A. In other examples, the script seed input 122 can be in the format of a screenplay (in a natural language text format, which is then preprocessed, parsed and converted into one or more script segments 116). In other examples, the script seed input 122 can be in the format of seed input text (words, sentences or paragraphs in natural language starting the narrative for the desired video), a seed input image, a seed input video, or a seed input audio in the form of a spoken narrative. The various formats of the script seed input 122 can be converted by the script writer module 130 (or another script production module 112) into descriptive text or vectors as necessary. The script seed input 122 is the start of the narrative, and can be used as the beginning of the script being generated by the script writer module 130 which continues the narrative.

There can be multiple script seed inputs 122 that are used by the script writer module 130. For example, the further script seed inputs 122 can relate to a middle of the narrative. The further script seed inputs 122 can include free form text of scene descriptions, character descriptions, and/or object descriptions. The further script seed inputs 122 can be pre-made or can be received after parts of the script or video have already been generated. The further script seed inputs 122 can input through the director device 108 or the user devices 110. In an example, a chat box through the director device 108 or the user devices 110 is used to input the further script seed inputs 122.

In an example, the script seed inputs 122 are contained in a document such as an XML document. In examples, the XML document can be edited by the director device 108 or the user devices 110, or via 3-way authorship. In examples, the XML, document can be manually edited or autonomously edited by the script writer module 130. The XML can include natural language text as to what is to happen at that particular time, in seconds, of the narrative (script). In an example, the XML document can also contain other trigger events rather than time in seconds. In an example, the XML, document is editable in real-time as script segments 118 are approved and locked, with parts of the XML document being locked for editing which correspond to the locked script segments 118 (and already rendered into the video 118 and live published).

An example XML document for the script seed inputs is as follows:

```xml
<?xml version="1.0"?>
<Bot name="BranchingTemplate">
  <Execute>
  <Run template="Branching" />
  </Execute>
  <Templates>
    <Template name="Branching">
      <Scene name="DinnerParty">
      <Delay duration="1s" />
      <SetText name="ShowTitle" value="Potatoes" />
        <!-- Scene Setup -->
        <SetSelect character="Dwayne" name="DPCharacterStage" value="1" />
        <SetSelect character="Sarah" name="DPCharacterStage" value="3" />
        <SetTrigger name="Intro" />
        <Delay duration="7s" />
        <!-- Frame1 -->
        <Bulk>Dwayne and Sarah sit around after a great meal. Sarah is mad at Dwayne and wants to breakup.
          Dwayne: Babe, those potatoes are (censored) delicious.</Bulk>
        <GenDialog characters="Dwayne, Sarah" duration="30s" />
        <Random>
          <!-- Frame1-1 -->
          <Group>
            <Bulk>Insert stage direction here.</Bulk>
            <GenDialog characters="Dwayne, Sarah" duration="30s" />
            <Random>
              <!-- Frame1-1-1 -->
              <Group>
                <Bulk>Insert stage direction here.</Bulk>
                <GenDialog characters="Dwayne, Sarah" duration="30s" />
                <Random>
                  <!-- Frame1-1-1-1 -->
                  <Group>
                    <Bulk>Insert stage direction here.</Bulk>
                    <GenDialog characters="Dwayne, Sarah" duration="30s" />
                  </Group>
                  <!-- Frame1-1-1-2 -->
                  <Group>
                    <Bulk>Insert stage direction here.</Bulk>
                    <GenDialog characters="Dwayne, Sarah" duration="30s" />
                  </Group>
                </Random>
              </Group>
              <!-- Frame1-1-2 -->
              <Group>
                <Bulk>Insert stage direction here.</Bulk>
                <GenDialog characters="Dwayne, Sarah" duration="30s" />
                <Random>
                  <!-- Frame1-1-2-1 -->
                  <Group>
                  <Bulk>Insert stage direction here.</Bulk>
                  <GenDialog characters="Dwayne, Sarah" duration="30s" />
                  </Group>
                  <!-- Frame1-1-2-2 -->
                  <Group>
                  <Bulk>Insert stage direction here.</Bulk>
                  <GenDialog characters="Dwayne, Sarah" duration="30s" />
                  </Group>
                </Random>
              </Group>
            </Random>
          </Group>
          <!-- Frame1-2 -->
          <Group>
            <Bulk>Insert stage direction here.</Bulk>
            <GenDialog characters="Dwayne, Sarah" duration="30s" />
            <Random>
              <!-- Frame1-2-1 -->
              <Group>
```

```xml
        <Bulk>Insert stage direction here.</Bulk>
        <GenDialog characters="Dwayne, Sarah" duration="30s" />
        <Random>
            <!-- Frame1-2-1-1 -->
            <Group>
                <Bulk>Insert stage direction here.</Bulk>
                <GenDialog characters="Dwayne, Sarah" duration="30s" />
            </Group>
            <!-- Frame1-2-1-2 -->
            <Group>
                <Bulk>Insert stage direction here.</Bulk>
                <GenDialog characters="Dwayne, Sarah" duration="30s" />
            </Group>
        </Random>
    </Group>
    <!-- Frame1-2-2 -->
    <Group>
        <Bulk>Insert stage direction here.</Bulk>
        <GenDialog characters="Dwayne, Sarah" duration="30s" />
        <Random>
            <!-- Frame1-2-2-1 -->
            <Group>
                <Bulk>Insert stage direction here.</Bulk>
                <GenDialog characters="Dwayne, Sarah" duration="30s" />
            </Group>
            <!-- Frame1-2-2-2 -->
            <Group>
                <Bulk>Insert stage direction here.</Bulk>
                <GenDialog characters="Dwayne, Sarah" duration="30s" />
            </Group>
        </Random>
    </Group>
  </Random>
 </Group>
</Random>
<!-- Outro -->
<SetTrigger name="Outro" />
<Delay duration="10s" />
        </Scene>
    </Template>
</Templates>
</Bot>
```

FIG. 3A illustrates a detailed block diagram of the back end infrastructure 106, in accordance with an example embodiment. The example back end infrastructure 106 shown in FIG. 3A includes at least one memory 302 (one shown), at least one processor 304 (one shown), and at least one communications interface 306 (one shown). A communication connection is implemented between the memory 302, the processor 304, and the communications interface 306, for example using a bus or other communication protocols. The processor 304 is configured to execute, from the script production modules 112 stored in the memory 302, steps of the script production method as detailed in FIG. 2.

The memory 302 can be a read-only memory (ROM), a static storage device, a dynamic storage device, or a random access memory (RAM). The memory 302 may store programs such as the script production modules 112. The memory 302 can be a non-transitory memory. The memory 302 can store one or more databases 308 (one shown). The database 308 can include all data received or generated by the script production modules 112. For example, the database 308 can include feeds, audience profiles, director profiles, script seed inputs 122 to the show production system 100, repository of scripts and videos, historical user feedback, the script segment messages 150, and any generated script segments 116 and generated videos 118. The database 308 can include asset libraries, which can include 3D objects and 3D avatars (for the characters), and scenes (both generated and pre-made). The same asset is used when the asset returns to a later scene in the instant script or instant video 118 being generated by the script production modules 112. The database 308 can include assets that were originally generated by one of the asset generation modules 334 and stored for re-use by another script or video 118. In an example, when a general description of an asset is manually or automatically provided, the closest asset from the database 308 is selected and used for the particular script segment message 150.

In some examples, the database 308 can include script segments 116 that were proposed by the script writer module 130 and not accepted (e.g. deleted) by the director device 108 or the user devices 110. The script writer module 130 can learn not to propose (generate) the same or similar script segment 116 that was deleted. For immediate purposes, the script writer module 130 will not cause an infinite loop of repeatedly proposing the same script segment. For long term purposes, the script writer module 130 learns particular trends and preferences of the director and the audience.

The processor 304 can be a general central processing unit (CPU), a microprocessor, an application-specific integrated circuit (ASIC), a graphics processing unit (GPU), a Tensor Processing Unit (TPU), or one or more integrated circuits. The processor 304 may be an integrated circuit chip with a signal processing capability. In an implementation process, steps of the script production method as described herein can be performed by an integrated logical circuit in a form of hardware or by an instruction in a form of software in the processor 304. In addition, the processor 304 can be a general purpose processor, a digital signal processor (DSP), an ASIC, a field programmable gate array (FPGA) or another programmable logic device, a discrete gate or a transistor logic device, or a discrete hardware assembly. The processor 304 can implement or execute the methods, steps, and logical block diagrams that are described in example embodiments. The general purpose processor can be a microprocessor, or the processor may be any conventional processor or the like. The steps of the script production method described with reference to the example embodiments may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 302. The processor 304 reads information from the memory 302, and completes, by using hardware in the processor 304, the steps of the script production method.

For the script production modules 112, a respective machine learning model 120 can be implemented by a respective neural network running on the back end infrastructure 106. For the script production modules 112, rules based models can implemented in some examples. For the script production modules 112, manual instructions and manual messages can be implemented in some examples.

The communications interface 306 implements communication between the back end infrastructure 106 and another device or communications network by using wireless or wired communication. In some examples, the training data may be obtained by using the communications interface 306.

In an example, the processor 304, with the communications interface 306, executes a live data application program interface (API) to communicate with feeds and third party services e.g. third party 3D object databases containing character avatars (characters) or objects.

It should be noted that, although the memory 302, the processor 304, and the communications interface 306 are shown in the back end infrastructure 106 in FIG. 3A, in a specific implementation process, a person skilled in the art should understand that the back end infrastructure 106 may further include other components that are necessary for implementing normal running. In addition, based on specific needs, a person skilled in the art should understand that the back end infrastructure 106 may further include hardware components that implement other additional functions. In addition, a person skilled in the art should understand that the back end infrastructure 106 may include only a component required for implementing the embodiments, without a need to include all the components shown in FIG. 3A. In other examples, the back end infrastructure 106 is executed on a local computer, the director device 108 or the user device 110, referred to as edge processing.

In some examples, the back end infrastructure 106 includes a server or a cloud server. In some examples, the back end infrastructure 106 includes third party machine learning processing and storage services such as Amazon Web Services (AWS)™, Microsoft Azure™, and Google Cloud™. In other examples, not shown, one or more of the script production modules 112 are executed by the director device 108, or one of the user devices 110, or other devices.

In some alternate examples (not shown here), the director device 108 or the user devices 110 include one or more of the script production modules 112 (including machine learning models 120, rules based modules, or manual input modules).

FIG. 4 illustrates a block diagram of the director device 108, in accordance with an example embodiment. The director device 108 can be an electronic device or user equipment. The director device 108 can be used by the director. The example director device 108 includes a memory 402, a processor 404, and a communications interface 406. The director device 108 can include input or output (I/O) interface devices 408, including but not limited to touch screen, display screen, keyboard, camera, microphone, speaker, mouse, and/or haptic feedback. In another example, the role of the director device 108 (or director) is learned and performed by the script production modules 112.

The memory 402 can store a script production application 410 for execution by the processor 404. In some examples, a web browser is used to execute the script production application 410. In other examples, the script production application 410 is a dedicated application. The script production application 410 can generate the director interface 140 to receive commands, edits, the script seed input 122, and other functions to or from the director which interact with the back end infrastructure 106. The director device 108 can include a front end interface 114 (FIG. 1) which interacts and communicates with the user devices 110, for example to create, edit and approve script segments 116. The front end interface 114 (FIG. 1) can be integrated with the director interface 140 in some examples. The memory 402 can store a player application 412, for execution by the processor 404, which is used to display the video 118 to the director. In some examples, the player application 412 is executed by a particular platform such as a video platform, social media platform, streaming platform, web platform, gaming platform, application plug-ins, etc. The script production application 410 and the player application 412 can be separate applications, as shown, or can be combined as a single application, not shown.

In some examples, the script production application 410 receives manually input information for the script seed input 122 from the director though the director interface 140 and forwards to the back end infrastructure 106. In some examples, the script production application 410 formats the information for the script seed input 122 into the same message format as the script segment message 150. For example, each phrase of stage direction the script seed input 122 is converted into a script segment 116 in the format of the script segment message 150.

Figure 5:
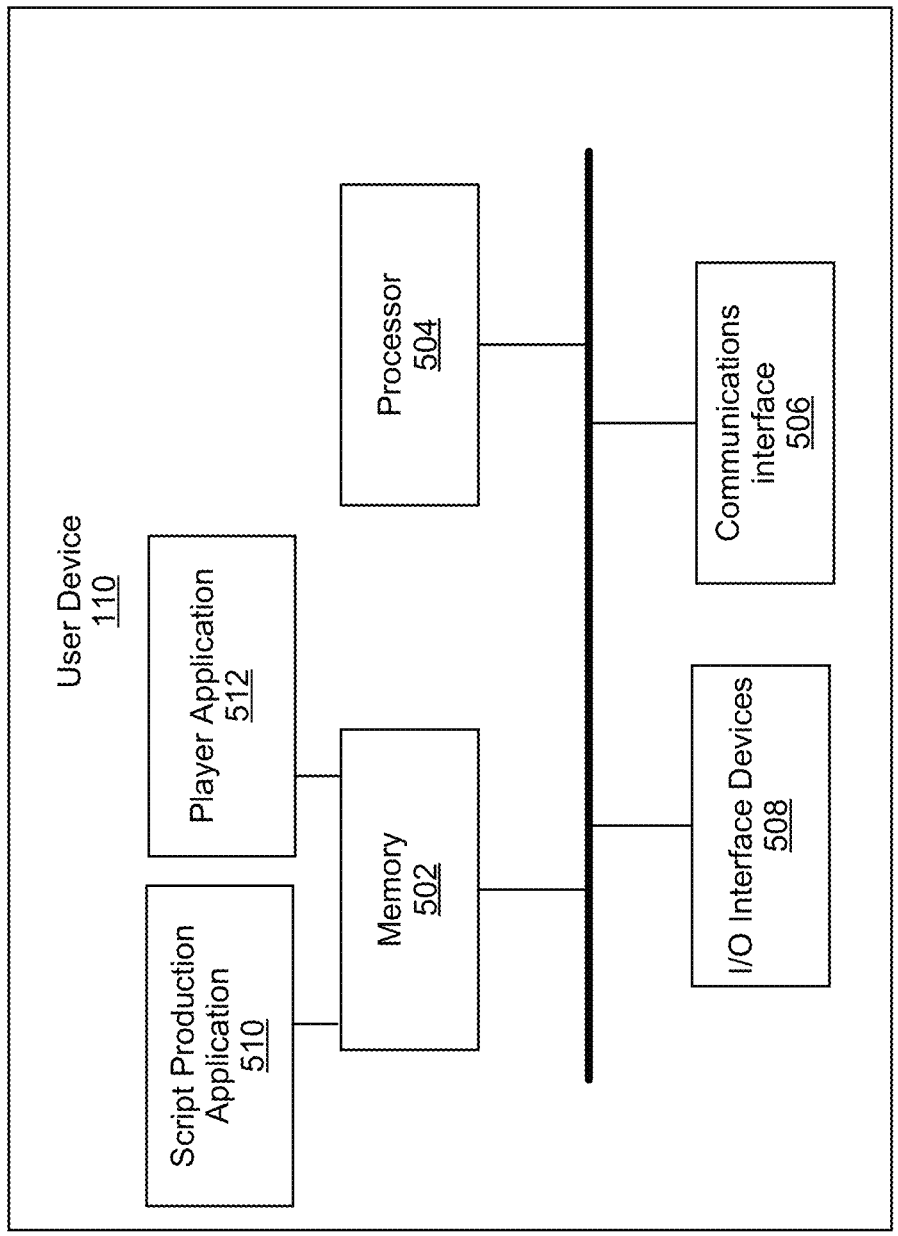
FIG. 5 illustrates a block diagram of a user device for the show production system of FIG. 1, in accordance with an example embodiment.

FIG. 5 illustrates a detailed block diagram of the user device 110, in accordance with an example embodiment. The user device 110 can be used by an audience member. The example user device 110 includes a memory 502, a processor 504, a communications interface 506, and I/O interface devices 508. The memory 502 can store a script production application 510 for execution by the processor 504. The script production application 510 can generate the audience interface 142 to receive commands, edits, and other functions to or from the audience which interact with the back end infrastructure 106. The memory 502 can store a player application 512, for execution by the processor 504. The components of the user device 110 can be similar to those described in relation to the director device 108 (FIG. 4). In some examples, the player application 512 is executed by a particular platform such as a video platform, mobile platform, social media platform, streaming platform, web platform, gaming platform, application plug-ins, etc. The user device 110 can include a front end interface 114 (FIG. 1) which interacts and communicates with the director device 108, for example to create, edit and approve script segments 116. The front end interface 114 can be integrated with the audience interface 142 in some examples. In other examples, the front end interface 114 is separate from the audience interface 142 such as the front end interface 114 being a third party messaging platform, third party video or audio conferencing service, or other third party communication service.

An example platform for the player application 512 is Twitch™, can be used for live streaming (live broadcast or live published) of the video 118. The player application 512 can also include audio feedback by way of a chat box for sending and receiving public and private messages between users and with the script production modules 112.

In an example, a live person has live video (camera) and audio (audio voice input or live sounds) through the player application 512, e.g. through Twitch™. In an example, the live person is treated as a character by the script production modules 112, the audio voice input is converted to text and is treated as a phrase that the character spoke, and the candidate script segments (and other data) are generated by the script production modules 112 that continue the narrative including the audio voice input. As well, image processing is used to interpret the action and sentiment of the live person received through the video (camera).

In some examples, the script production application 510 receives information such as proposed script segments 116 from the audience though the audience interface 142 and forwards to the director device 108. In some examples, the script production application 410 formats the information into the same message format as the script segment message 150. For examples, each script segment 116 is a script segment message 150.

The script production application 510 can receive a script segment message 150 from the back end infrastructure 106 or the director device 108, which contains a proposed script segment 116. The script segment message 150 can contain the proposed script segment 116 to which the user device 110 can provide feedback or proposed edits to the director device 108.

The user device 110 can be an electronic device or user equipment for interacting with the audience. The user device 110 can be a desktop, a laptop, a set top box, or a mobile communication device such as a smart phone or a tablet. In an example, one of the I/O interface devices 508 can be a communal display screen, for example a movie theatre screen. In such an example, the audience can provide feedback through their user devices 110 which causes output of the video 118 that was generated via 3-way authorship, to the communal display screen.

FIG. 6 illustrates an example message format of the script segment message 150, in accordance with an example embodiment. Each script segment message 150 represents a script segment 116, and each script segment message 150 can be used to generate a respective video segment of the video 118. The script segment message 150 can be transmitted between the script production modules 112. For example, each of the script production modules 112 can be configured with interceptors or state based triggers in order to respond to the script segment message 150 from the database 308. In other examples, one script production module 112 can receive a script segment message 150, generate new data for the script segment message 150, and send the script segment message 150 to the next script production module 112 in the pipeline of the script production method. The script segment message 150 can also be transmitted to and from the director device 108 and the user devices 110.

In an example, each script segment message 150 represents a script segment 116. The script segment 116 can be, for example, a stage direction or a phrase (including the character who is speaking the phrase). A script can have a number of script elements or fields, including: scene heading; action; character; phrase; parenthetical; extensions; transition; and shot. In an example, these script elements can each be a respective separate script segment 116. In other examples, some of these script elements can be combined into a particular script segment 116.

A script or proposed script can be pieced together from a number of the script segment messages 150 in sequence. Similarly, the video 118 can be generated (rendered) from a number of the script segment messages 150 in sequence. Using script segment messages 150 as a communication protocol, the script segments 116 can be generated by the script writer module 130 and transmitted to the director interface 140 for approval or editing by the director device 108. Each script segment message 150 can be generated from a stage direction or a phrase that is manually created by the director device 108 or one of the user devices 110.

The script segment message 150 includes a plurality of fields or metadata. The script segment message 150 includes a script segment field 602 which represents a script segment 116. The script segment field 602 includes segment ID, dispatch ID, trigger timestamp, estimated duration, locked, deleted, segment metadata 154 and subsegment 604. Locked means approved to be rendered into the video 118. Note that "deleted" script segments 116 are still taken into account by the script writer module 130 to avoid infinite loops and to avoid continuously proposing the same script segment 116 over and over. The "deleted" script segments 116 can also be used by the script writer module 130 to learn preferences of the director and the audience.

The subsegment 604 includes one of: the system signal 156, the stage direction 610, and the phrase 612. The system signal 156 can include the signal kind 614, the character 616, and a message. The signal kind 614 can include error, add character or remove character. In other examples, the signal kind 614 can include scene change, animation triggers, sound effect triggers, ending a scene, lighting cues, camera cues, ending a show, etc. The character 616 field can include the name (name of the character, e.g. Dwayne or Sarah as in FIG. 7A) and additional metadata relating to the character such as whether the character is on-stage, denoted by the "active" field.

The segment metadata 154 includes processing metadata 618, audio metadata 620, sentiment metadata 622, and keyword metadata 624, and other metadata 628. The processing metadata 618 includes provider, submitted timestamp, earliest locked timestamp, dispatched timestamp, trigger latency. The processing metadata 618 allows a technical introspection of the state of the system and the performance of the various components. Additionally it allows for proper timing of message delivery in video segments of the video 118. In examples, the other metadata 628 can include: search relevancy metadata, offensiveness metadata, and/or 3D asset metadata, or other metadata, etc.

The audio metadata 620 includes audio byte buffer, audio duration (in ms), and audio sampling rate.

The sentiment metadata 622 includes emoji data and sentiment data 626. The sentiment data 626 includes emoji label, emoji character, probability, and emotion. The keyword metadata 624 includes the original message and keywords (which can be extracted from the original message). In an example, keywords in the keyword metadata 624 are given a higher priority or weight than other words in the script segment 116 by the script analysis module 132 and/or the back end rendering module 134. For example, "Dwayne enters and drives a car on the street" may have "car" as a keyword, which is given higher priority than "street".

In an example, the sentiment metadata 622 is generated by the script analysis module 132 using Deepmoji from MIT, as understood in the art, which is a deep learning model that understands many nuances of how language is used to express emotions. Emotions can, for example, be expressed as text or as emojis.

In an example, not shown in FIG. 6, set information and environment information is generated by the script analysis module 132, using the script segment 116. The set information can include one or more objects, building infrastructure, ground infrastructure, background, foreground, etc. The foreground does not include the characters. The environment information can include weather, lighting, wind, gravity value, time of day, location, etc. In some examples, the set information and environment information can be generated by the script analysis module 132 from the stage direction 610 and/or the segment metadata 154.

The set information and environment information can be contained in the stage direction 610 of the script segment message 150. In some examples, the set information and environment information are stand alone fields in the script segment message 150, for example in the segment metadata 154. In some examples, the set information and environment information can be stand alone files or a separate process performed by the script analysis module 132. The generated set information and environment information can be proposed to the director device 108 or the user devices 110 for editing, replacement and approval. In some examples, there can be predesigned selectable set information and environment information. In some examples, objects for the set information can be dynamically generated, be in the database 308 (FIG. 3A), or obtained from a third party service or library.

For example, the stage direction 610 in the script segment message 150 may state "Dwayne sits on chair." In such an example, the script analysis module 132 recognizes that a chair object is required, and can insert a chair object into the segment metadata 154 for insertion into the video 118. The chair object can be in the keyword metadata 624. A chair object from a 3D model can be obtained by the back end rendering module 134. Alternatively, the script analysis module 132 uses a chair object that is already in the script (i.e., a 3D model of a chair already introduced in a previous script segment 116), and the same chair object is used in the visual enriching data 162. The script analysis module 132 can also generate environment data based on analysis of the script segment message 150. The environment data can include visual enriching data 162. The back end rendering module 134 can also generate environmental audio data for the audio enriching data 160, e.g. birds chirping, traffic, wind, water, conversation din, white noise, etc.

FIG. 7A illustrates an example interface screen 700 for the director interface 140, in accordance with an example embodiment. Some examples of the example interface screen 700 can be applied to non-visual interfaces such as voice, audio, and haptic (touch). In some examples, the interface screen 700 can include more or fewer fields (or options) than those illustrated in FIG. 7A. The interface screen 700 can include any one or all of the fields of the script segment message 150, which can be edited or approved by the director through the interface screen 700. Any one or all of the fields of the script segment message 150 can be populated by the director through the interface screen 700 to create new script segment messages 150 (to generate new script segments 116 and video segments).

As shown in FIG. 7A, the example interface screen 700 is a sequence or chronology that runs from top to bottom, as illustrated by time arrow 702. The time arrow 702 can be displayed on the interface screen 700 in some examples, or other indicators can be displayed such as fading out (see FIG. 7B), or otherwise locking particular script segments 116 as those script segments 116 become rendered into video 118.

The title field 704 is the name of the project, e.g. "Project Dinner Party—Director's chair". The script segment fields 706 are script segments 116 shown in chronology. The script segment fields 706 can be in a queue of script segments 116 to be rendered into the video 118. Each script segment field 706 can correspond to one of: a system signal 156, a stage direction 610, or a phrase 612 (including the character speaking the phrase 612). In the present example, the script segment fields 706 are proposed script segments 116 that are manually entered by the director and are used as the script seed input 122. The script seed input 122 is used by the script writer module 130 (FIG. 2) to generate new script segments 116 that continue the narrative of the proposed script segment fields 706. As more script segments 116 are generated by the script writer module 130, those become pending script segments 116 which are displayed after the last script segment field 706g as further script segment fields 706. Those pending script segments 116 can be pending approval by the director device 108. The director can, through the interface screen 700, edit or delete any pending script segment fields 706, manually insert new script segment fields 706, and approve any pending script segment fields 706.

The start button 708 and stop button 710 are used to instruct the rendering modules 128 to render the pending script segment fields 706 into the video 118. The status field 712 (e.g. "paused") indicates the present status of the rendering and the outputting of the video 118 to the director device 108 and the user devices 110. In examples, the status field 712 can be "play", "paused", "stop", etc.

Referring to the present example in FIG. 7A, the script segments 706 relate to a dialogue between character "Dwayne" and character "Sarah". Script segment field 706a is a system signal 156 to add character "Dwayne". Script segment field 706b is a system signal 156 to add character "Sarah". Script segment field 706c is a stage direction 610 of "Dwayne and Sarah sit across the table from each other after finishing dinner. Dwayne is a gym rat, but he loves Sarah to death. While Sarah knows that Dwayne has a heart of gold, she just can't see having children with him". The stage direction 610 is part of the seed narrative for the rest of the video 118. Script segment field 706d is a phrase 612 from character Dwayne: "Babe, those potatoes were delicious, you're just so good in the kitchen". Script segment field 706e is a phrase 612 from character Sarah: "Thanks, Babe . . . ". Script segment field 706f is a phrase 612 from character Dwayne: "I really love how things are going with us, you know? I just really feel a connection." Script segment field 706g is a phrase 612 from character Sarah: "Right."

The script segment fields 706a-706g relate to a seed or starting narrative that is desired to have the narrative continued by the script writer module 130. The script segment fields 706a-706g are used as the script seed input 122, in which the script writer module 130 generates further script segment fields 706 (new pending script segments 116) which are to be generated and displayed on the interface screen 700 or to the user devices 110. The script analysis module 132 can generate segment metadata 154 for the script segment fields 706a-706g.

Figure 7B:
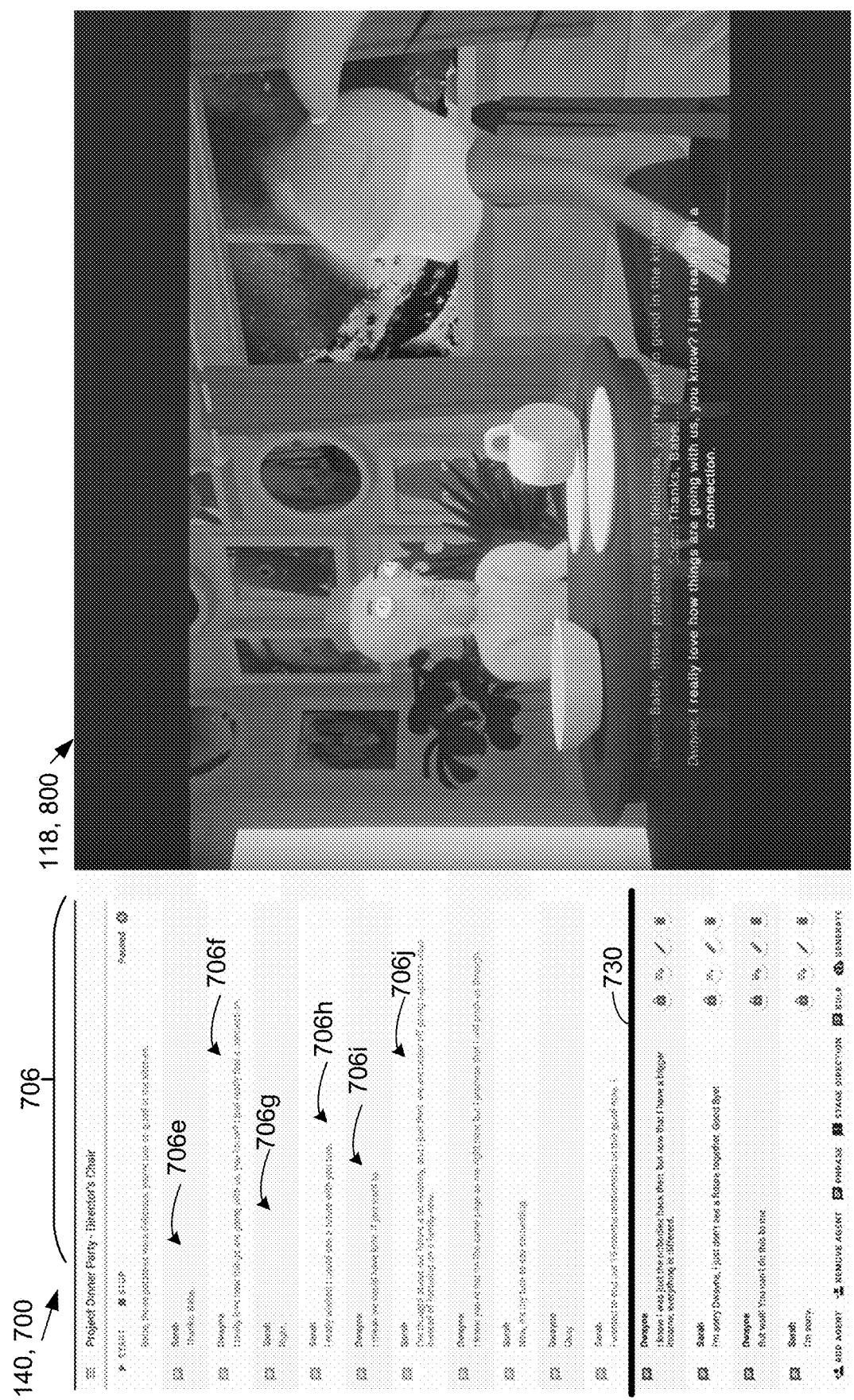
FIG. 7B illustrates another example interface screen continued from the interface screen of FIG. 7A.

Referring now to FIG. 7B, the script writer module 130 continues the narrative after script segment field 706g by generating new script segment fields 706. For example, script segment field 706h is a phrase 612 from character Sarah: "I really wished I could see a future with you two." Script segment field 706i is a phrase 612 from character Dwayne: "I mean we could have kids, if you want to." Script segment field 706j is a phrase 612 from character Sarah: "I've thought about our future a lot recently, and I just think we are better off going separate ways instead of focusing on a family now.", and so forth with further script segment fields 706. The script analysis module 132 can generate segment metadata 154 for the script segment fields 706h-706j, and so forth. In an example, not shown here, the script writer module 130 can also generate one or more stage directions 610 for the script segment fields 706, as new script segment fields. The phrases between Dwayne and Sarah are an original dialogue.

The set and direction in the video 118 was extracted from the stage direction 706c, including "sit across the table from each other", "after finishing dinner", which can be populated in the keyword metadata 624 (FIG. 6). In other examples, the particular script seed input 122 can be inspired by a particular setting and/or characters that are preconfigured. The video 118 is generated using the script segment fields 706 and the preconfigured setting and/or characters.

As shown in FIG. 7B, the script segment fields 706 that have been finalized and rendered to the video 118 are faded out. In an example, for example during real-time streaming of the video 118, those script segment fields 706 are also locked and cannot be edited or deleted through the interface screen 700. In an example, those script segment fields 706 that are faded out have also been published live and online, e.g., to the user devices 110 over the Internet, or to other live media such as television. Therefore, those script segment fields 706 are not editable after being locked and published live as video 118 by the front end rendering module 136. While those script segment fields 706 are being published live, yet more script segment fields 706 are generated by the script writer module 130, as well as segment metadata 154, and are displayed on the interface screen 700 as new script segment fields 706 that are later in the queue, for editing, approval and locking through the interface screen 700.

In another example, those script segment fields 706 that are faded out have been rendered into video segments to form a video, and those video segments, are viewed live by the director device 108 and the user devices 110 in a closed community. The video created by three way authorship can then be stored, reviewed, and/or later published.

A horizontal time bar 730 (which may be movable) can also be used to divide the locked from the unlocked script segment fields 706. In an example, not shown here, more script segment fields 706 (previous or pending) may be viewed by zooming out of the interface screen 700 or scrolling through the interface screen 700.

The script segments (script segment field 706) that are locked are earlier in the queue, above the horizontal time bar 730, and are shown as higher on the interface screen 700. The script segments (script segment field 706) in the queue that have not been locked are later in the queue, below the horizontal time bar 730, and are shown as lower on the interface screen 700. The script segments later in the queue (not locked and below the horizontal time bar 730) can still be edited using the 714 script segment toolbar 714 (FIG. 7A).

The rendering modules 128 are used to render (generate) the video 118 based on the script segment fields 706. The back end rendering module 134 generates audio enriching data and/or visual enriching data for the video 118. As shown in FIG. 7B, an example of the rendered video 800 is displayed side-by-side with the script segment fields 706 (and other options).

Referring again to FIG. 7A, a script segment toolbar 714 can be used to edit the particular script segment field 706. A lock option 714a is used to approve and lock in a particular pending script segment field 706. An add option 714b is used to insert a new script segment field 706 at that particular position on the queue or timeline (which can be a system signal 156, a stage direction 610 (in natural language), or a phrase 612). An edit option 714c is used to edit a particular pending script segment field 706. A delete option 714d is used to delete a particular pending script segment field 706. In an example, the addition, editing or deletion of a particular pending script segment 706 causes the generating of the segment metadata 154 by the script analysis module 132 to start over.

Referring again to FIG. 7A, an add character option 716 can be used to add a character as a system signal 156 in a new script segment field 706, i.e., the character enters the scene in the video 118. A remove character option 718 can be used to remove a character as a system signal 156 in a new script segment field 706, i.e., the character leaves the scene in the video 118. A phrase option 720 can be used to add a new phrase 612 in a new script segment field 706. A stage direction option 722 can be used to add a new stage direction 610 (in natural language) in a new script segment field 706. A bulk option 724 can be used to add more than one new script segment at a time (as one or more new script segment fields 706). The generate option 726 is used to instruct the script writer module 130 to generate new script segments 116 corresponding to new script segment fields 706, based on all of the previous script segment fields 706.

In some examples, not shown here, the example interface screen 700 can include the respective segment metadata 154 or any of the fields of the script segment message 150 (FIG. 6), which can be added, edited, deleted, or approved.

In some examples, not shown, the example interface screen 700 can include a message box to receive messages and feedback from the user devices 110.

In some examples, not shown, a similar interface screen to the example interface screen 700 can be displayed on the audience interface 142 of the user devices 110 for interaction with the audience. The audience interface 142 for the user devices 110 can include a menu of any one or all of the fields of the script segment message 150, which can be edited, added, deleted, etc. The user devices 110 can propose new script segment messages 150, e.g. with phrase, stage direction, or any one or all of the fields of the script segment message 150. Interactions through the audience interface 142 can be sent from the user device 110 to the director device 108 by way of the script segment message 150 or other communication protocols.

In some examples, the audience interface 142 can be used by the audience to provide feedback to the director device 108 or to the back end infrastructure 106. The feedback can be in the form of edits, deletions, additions to any fields of the script segment message 150. In some examples, the feedback can include text input, which can be input into a comment box or message box. In some examples, the feedback can include emotions, sentiments, emoji, emoticons, text, subscriptions, likes, donations, votes, ratings, viewing time (i.e., is the user device 110 still displaying the video 118), etc. In some examples, not shown here, the audience interface 142 can include a detector, such as a camera or sensor, that is used to detect feedback from the audience, for example heartbeat, electroencephalogram (EEG) signals, dance signals, facial expressions, temperature, or walking or running speed, etc.

In some examples, not shown here, the audience interface 142 can include a chat box which includes public and private messages to and from the audience. An example of a streaming platform having a chat box is Twitch™, and the messages in the chat box can be parsed by the script production modules 112 to gauge the audience feedback. In an example, stickers or emojis/emoticons from the chat box (e.g. Twitch™) are used to generate the script segment messages 150. In an example, these stickers or emojis/emoticons can be rules-based, such as a banana or hotdog sticker meaning that such an item is included in the script segment message 150 and is displayed (e.g. placed, thrown or moving) onto the video 118. In another example, these stickers or emoticons are used for general feedback or context, for example happy face or positive stickers (e.g. unicorn) meaning happy sentiment and context for the script segment message 150, and can result in the proposed script segments 116 continuing the narrative (scene) without substantive changes. Unhappy/negative face or unhappy/negative sentiment stickers can mean unhappy sentiment and context for the script segment message 150, and can result in more drastic changes in the proposed script segments 116 such as adding or removing an asset or character, or adding erratic, exciting or action-based script segments 116.

In response to the feedback, more script segments 116 and more video 118 can be generated taking into account the feedback. The video 118 generated by the script production modules 112, the audience and the director is denoted 3-way authorship.

Figure 7C:
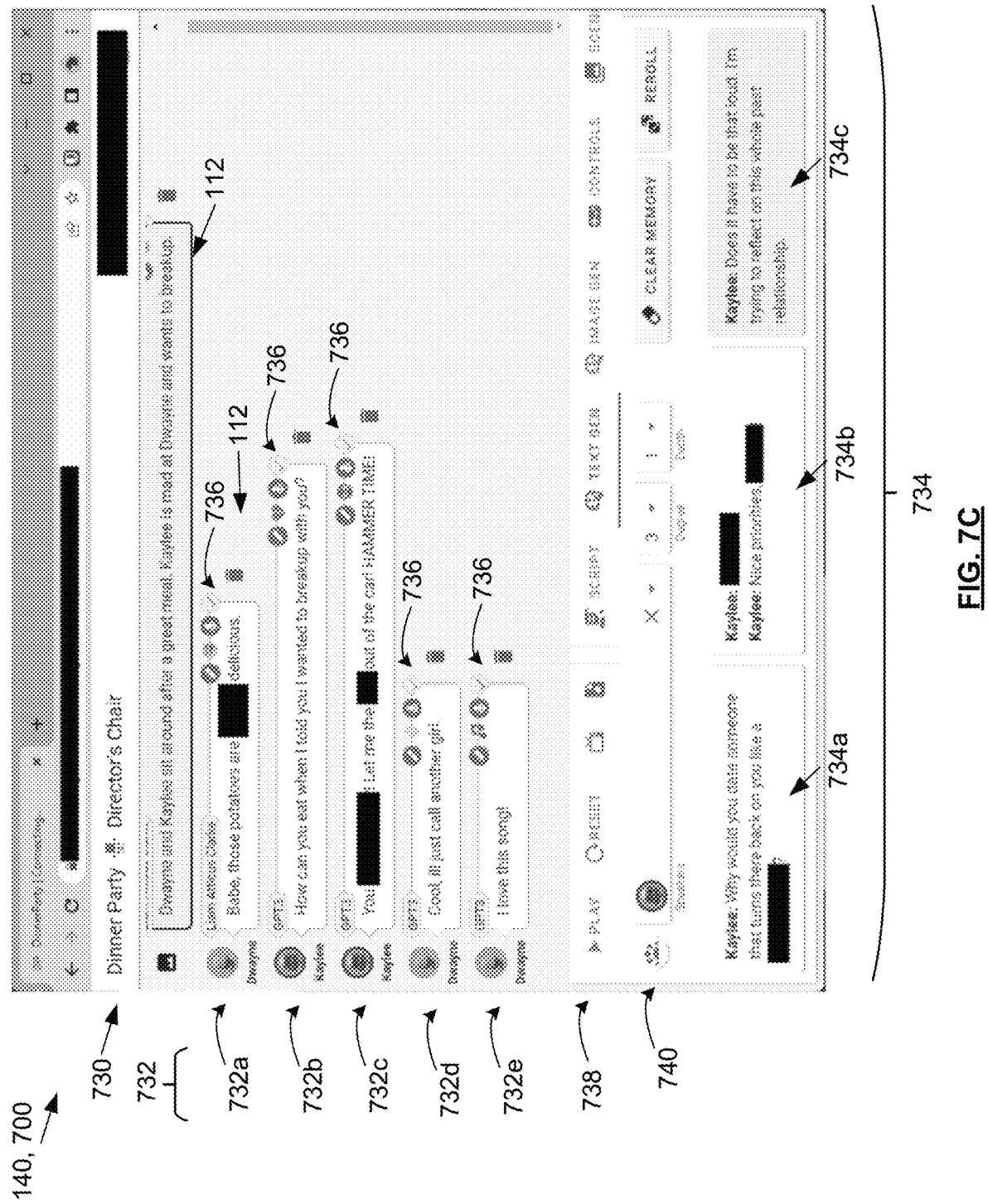
FIG. 7C illustrates another example interface screen for the director device of FIG. 4 to display and edit different narrative branches of script segments, in accordance with an example embodiment.

FIG. 7C illustrates another example interface screen 700 for the director interface 140 of the director device of FIG. 4 to display and edit different branches of proposed script segments 116 by the script production modules 112, in accordance with an example embodiment. A similar interface can be used for the user devices 110, with more or fewer features. Any blackouts shown here are for censorship purposes and are not intending to be limiting.

Generally, the script writer module 130 can generate and propose a plurality of parallel candidate queues 734a, 734b, 734c (each or collectively 734) of script segments 116. Any one of the queues 734 can be selected by the director through the director device 108, or by the audience (e.g. voting) through the user devices 110, or selected autonomously by the script writer module 130 having an automated selection system. The automated selection system takes into account the further seed inputs for performing the selection. In an example, the automated selection system includes a machine learning model. The script segments 116 in the selected queue 734 can then be added, edited, deleted, and approved as described in detail herein.

The title field 730 is the name of the project, e.g. "Dinner Party—Director's chair". The characters in this example are Dwayne and Kaylee. The seed script input 122 describes the scene, e.g. "Dwayne and Kaylee sit around after a great meal . . . ". The script segment fields 732 are script segments 116 shown in chronology. In an example, the script segment field 732a is a manually inserted seed script input 112 in script format (a phrase and the character to speak the phrase, Dwayne).

The script seed input 122 is used by the script writer module 130 (FIG. 2) to generate a plurality of queues 734, each queue 734 containing proposed script segment fields 706 that continue the narrative. The selected queue 734 of script segments 116 are to be rendered into the video 118. Each script segment field 732 can correspond to one of: a system signal, a stage direction, or a phrase (including the character speaking the phrase). As more script segments 116 are generated by the script writer module 130, those become pending script segments 116 which are displayed after the last script segment field 732e as further script segment fields 732. Those pending script segments 116 can be pending approval by the director device 108. The director can, through the interface screen 700, edit or delete any pending script segment fields 732, manually insert new script segment fields 732, and approve any pending script segment fields 732.

Upon selection of one of the queues 734, those script segments in the selected queue 734 are used to further populate the script segment fields 732 at the end of the last script segment field (732e in this example). Those script segment fields 732 can be further enriched by the script production modules 112, and edited and approved accordingly.

Each script segment field 732 includes status icons 736, which can include any of the following:
Pen: status of Natural Language Processing
Emoji: status of the emotional analysis module. It displays the top-ranked result (represented as an emoji) when processing is complete.
Microphone: status of the Text-to-Speech (TTS) module.
Checkmark: Ready to deliver/delivered status.
The status icons can be shown in different colors as follows:
Grey: unprocessed/not ready for delivery.
Blue: processed/ready for delivery.
Green (only used for checkmark): delivered.
The menu 738 can be used to:
Play: play (send or display) the rendered video,
Reset: reset the script segments
TV Icon: Open a separate window containing a WebGL client for rendering the video show in real-time.
Download File Icon: Download a transcript of the entire show.
The menu 740 can be used to:
Speakers: select the character to speak the next phrase of the queue.
Degree: select the number of parallel queues.
Depth: select the number of candidate script segments to generate per queue.
Clear Memory: remove the queues.
Reroll: Create new queues. Note that different candidate script segments are generated than the previously proposed candidate script segments.

Further queues 734 are generated or re-generated in an incremental and iterative fashion, as further script segments 116 are approved and audience feedback is received.

FIG. 8 illustrates an example of the video 800 generated by the script production modules 112 based on the example interface screen 700 in FIGS. 7A and 7B, in accordance with an example embodiment. For example, one or more script segments 116 are generated by the script writer module 130 from the script seed input 122. For example, based on the feedback provided by the director interface 140, the screen segment 116 can be manually edited, for example the phrase 612, stage direction 610, or other elements of the script segment message 150. The video 118 (e.g. video segments) can be generated by the rendering modules 128 from the script segments 116. For example, the video 118 can be transmitted from the front end rendering module 136 to the user devices 110 and the director device 108 for display of the video 118.

The example video 800 can include the avatar for the characters, Dwayne 802 and Sarah 804. The example video 800 can include closed captioning 806 of the phrases from the interface screen 700 in FIGS. 7A and 7B. In an example, the closed captioning 806 can include the stage directions in FIGS. 7A and 7B. The example video 800 includes audio which is from the audio enriching data 160. The audio can be the phrases of the characters, with appropriate pitch, emotion, cadence and timing based on the segment metadata 154. For example, if the character has been configured to speak with a child's voice, the audio enriching data 160 may be rendered with a higher pitch. The audio enriching data 160 can take into account the sentiment metadata 622, to convey the sentiment or emotion in the phrase.

In some examples, the video 118 can be generated for an indefinite period, theoretically forever to infinity. For example, the video 118 is generated and output (streamed or live published) by the front end rendering module 136 for 24 hours a day. The video 118 can be manually stopped or a particular trigger is detected.

Figure 9A:
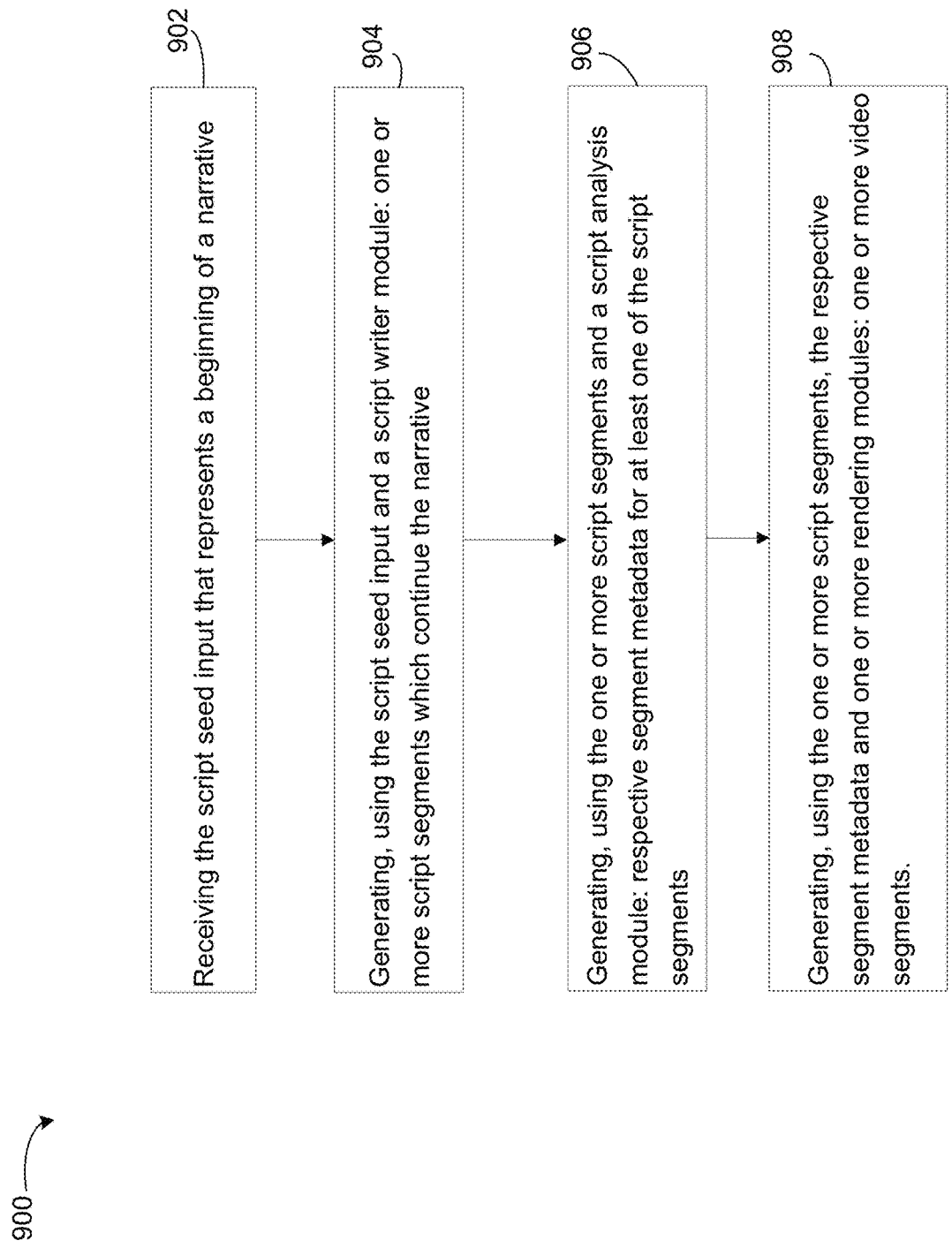
FIG. 9A illustrates an example flow diagram of the script production method of FIG. 1, in accordance with an example embodiment.

FIG. 9A illustrates an example of the script production method 900 as performed by the back end infrastructure 106, in accordance with an example embodiment. At step 902, the back end infrastructure 106 receives a script seed input 122 that represents a beginning of a narrative. At step 904, the script writer module 130 generates, using the script seed input 122: one or more script segments 116 (i.e. a script) which continue the narrative. At step 906, the script analysis module 132 generates, using the script segments 116: respective segment metadata 154 for at least one of the script segments 116. At step 908, the rendering modules 128 generate, using the script segments 116, the respective segment metadata 154: one or more video segments of the video 118.

Figure 9B:
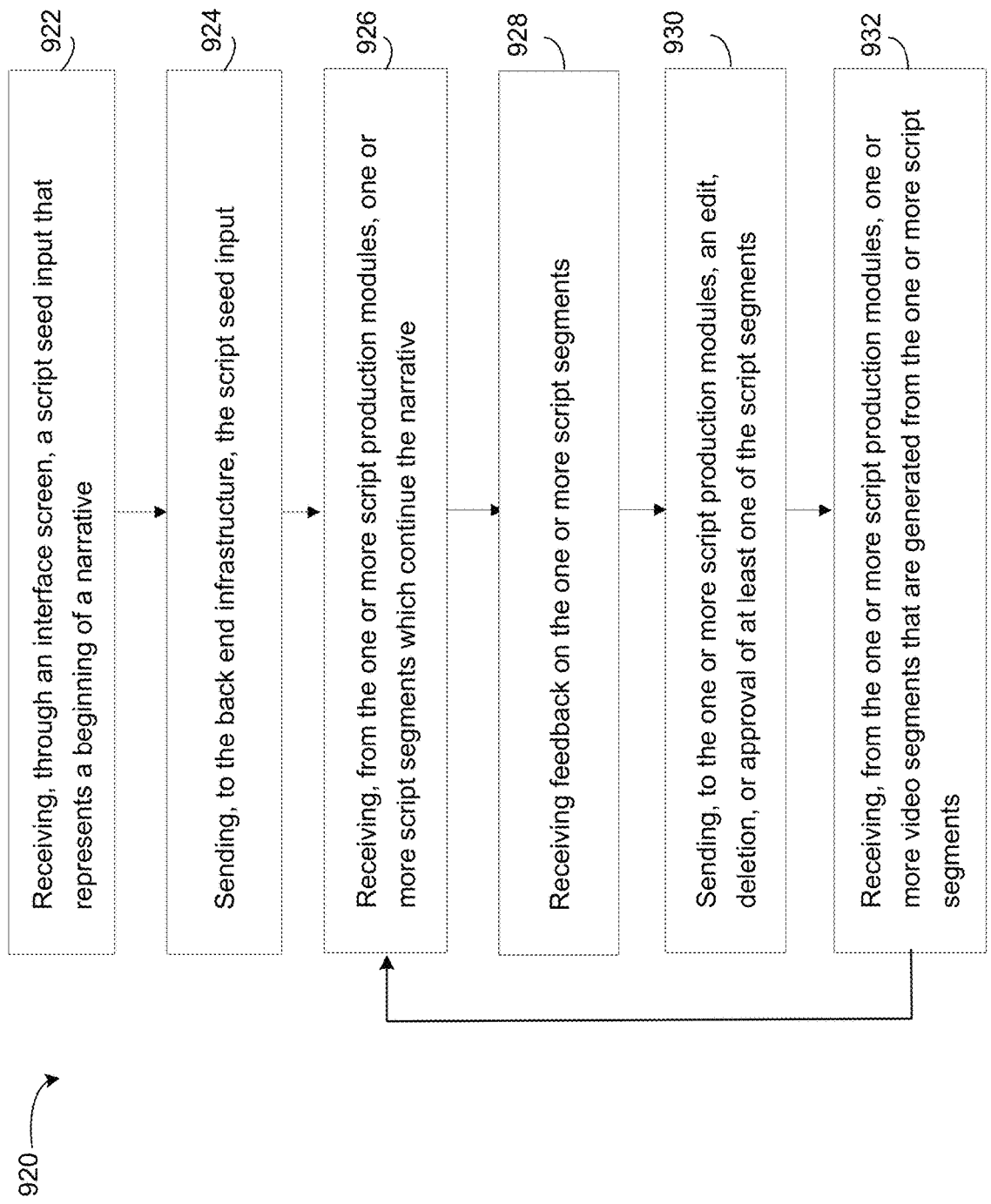
FIG. 9B illustrates another example flow diagram of the script production method of FIG. 1, in accordance with an example embodiment.

FIG. 9B illustrates an example of the script production method 920 as performed by the director device 108, in accordance with an example embodiment. At step 922, the director device 108 receives, through the interface screen, a script seed input 122 from the director. The script seed input 122 represents a beginning of a narrative. In some examples, the script seed input 122 is proposed by one or more of the user devices 110 and is edited and/or accepted by the director.

At step 924, the director device 108 sends, to the back end infrastructure 106 which includes the script production modules 112, the script seed input 122. At step 926, the director device 108 receives, from the back end infrastructure 106, one or more script segments 116 (i.e. a script) which continue the narrative. At step 928, optionally, the director device 108 receives feedback on the one or more script segments 116, e.g. from the director through the interface screen or from the user devices 110 (audience members). At step 930, the director device 108 sends, to the one or more script production modules, an edit, deletion, or approval of at least one of the script segments 116. At step 932, the director device 108 receives, from the back end infrastructure 106, one or more video segments that are generated from the one or more script segments 116. The method can loop to step 926, either ad infinitum or until a suitable stop or trigger.

Figure 9C:
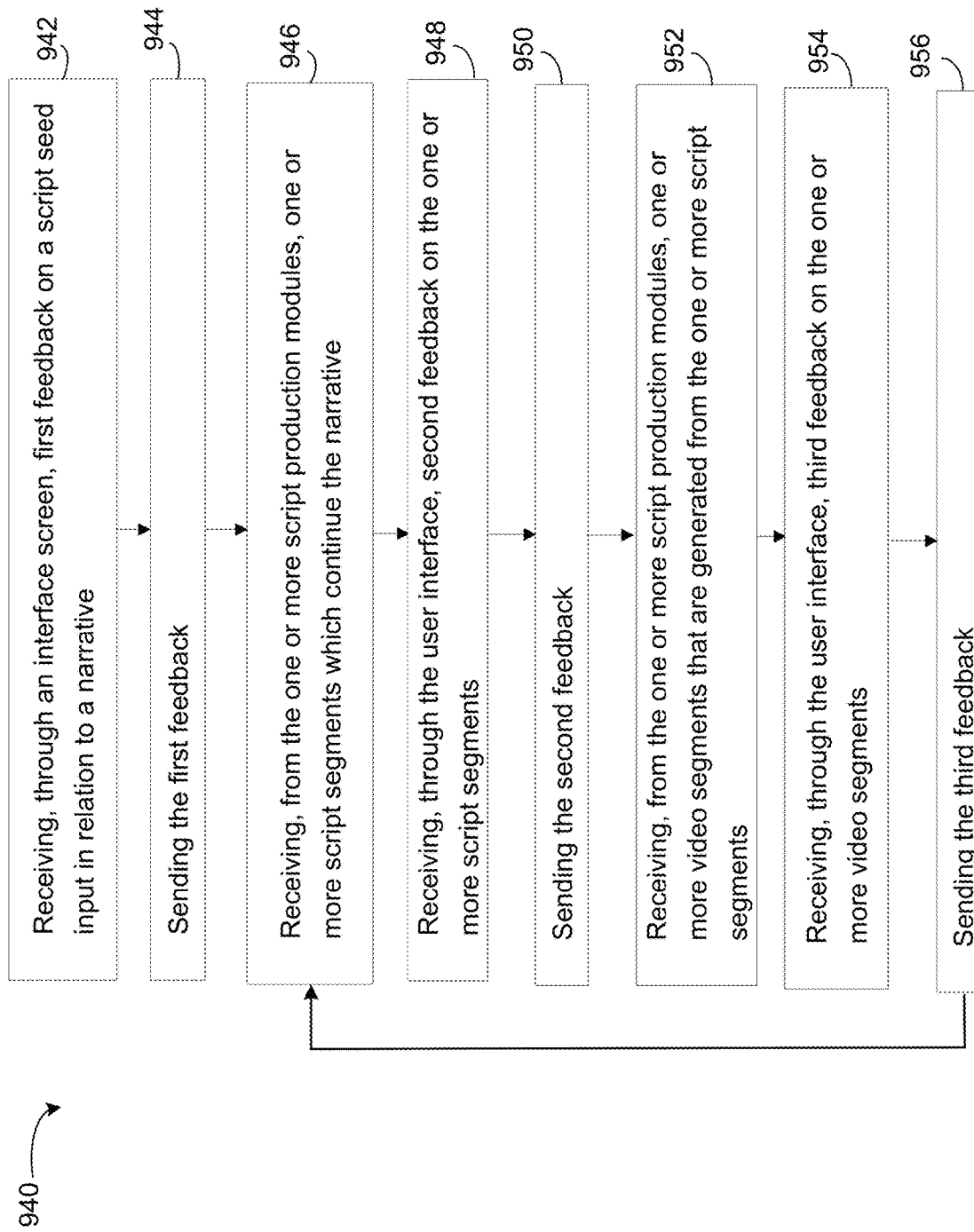
FIG. 9C illustrates another example flow diagram of the script production method of FIG. 1, in accordance with an example embodiment.

FIG. 9C illustrates an example of the script production method 940 as performed by the user device 110, in accordance with an example embodiment. At step 942, the user device 110 receives, through a user interface (any of the I/O interface devices 508), first feedback on a script seed input 122 from an audience member. The script seed input 122 represents a beginning of a narrative. In some examples, the first feedback on the script seed input 122 is taken into account, is edited and/or accepted by the director or the script production modules 112.

At step 944, the user device 110 sends, to either the director device 108 or the back end infrastructure 106, the first feedback on the script seed input 122. At step 946, the user device 110 receives, from the back end infrastructure 106, one or more script segments 116 (i.e. a script) which continue the narrative. At step 948, the user device 110 receives, through the user interface, second feedback on the one or more script segments 116. At step 950, the user device 110 sends, to either the director device 108 or the back end infrastructure 106, the second feedback on the one or more script segments 116. At step 952, the user device 110 receives, from the back end infrastructure 106, one or more video segments that are generated from the one or more script segments 116. The video segments are output to the user interface or a display screen of the user device 110. At step 954, the user device 110 receives, through the user interface, third feedback on the one or more video segments. At step 956, the sends, to either the director device 108 or the back end infrastructure 106, the third feedback on the one or more video segments. The method can loop to step 946, either ad infinitum or until a suitable stop or trigger. The method 940 can be performed in parallel from a plurality of user devices 110, so that each respective audience member of the user devices 110 can send their first feedback, second feedback, and/or third feedback.

As can be appreciated, the back end infrastructure 106 generates the video segments based on the first feedback, second feedback, and/or third feedback from one or more of the audience members.

The first feedback, the second feedback, and the third feedback can be text inputs or physiological information of the audience detected by a detector of the user device 110. The first feedback can be an addition, edit, or deletion of part of the script seed input 122. The second feedback can be an addition, edit, or deletion of at least one script segment 116. The third feedback can be sentiment information, keyboard inputs (comments), camera captures, sensor information, etc. based on audience reaction to the video segments. In response, the continued narrative of future script segments 116 and video segments generated by the back end infrastructure 106 are affected by audience feedback by way of the first feedback, the second feedback, and the third feedback.

In the example embodiments, it should be understood that the described show production system 100, the script production method, the back end infrastructure 106, the director device 108, and the user devices 110 may be implemented in other manners. For example, the described back end infrastructure 106 is merely an example embodiment. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units may be implemented in electronic, mechanical, or other forms. In some examples, the back end infrastructure 106 may be provided on the director device 108 or the user devices 110.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of example embodiments may be implemented in the form of a software product. The software product is stored in a storage medium, and includes several instructions for instructing a computer device (which may be a personal computer, a server, or a network device) to perform all or some of the steps of the methods described in the example embodiments. The foregoing storage medium includes any medium that can store program code, such as a Universal Serial Bus (USB) flash drive, a removable hard disk, a read-only memory (ROM), a random access memory (RAM), a magnetic disk, or an optical disc. In an example, the software product can be an inference model generated from a machine learning training process.

In the described methods or block diagrams, the boxes may represent events, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The described embodiments are considered to be illustrative and not restrictive. Example embodiments described as methods would similarly apply to systems or devices, and vice-versa.

The various example embodiments are merely examples and are in no way meant to limit the scope of the example embodiments. Variations of the innovations described herein will be apparent to persons of ordinary skill in the art, such variations being within the intended scope of the example embodiments. In particular, features from one or more of the example embodiments may be selected to create alternative embodiments comprised of a sub-combination of features which may not be explicitly described. In addition, features from one or more of the described example embodiments may be selected and combined to create alternative example embodiments composed of a combination of features which may not be explicitly described. Features suitable for such combinations and sub-combinations would be readily apparent to persons skilled in the art. The subject matter described herein intends to cover all suitable changes in technology.

What is claimed is:

1. A script production method, comprising:
   receiving a script seed input that represents a beginning of a narrative;
   generating, using the script seed input and a script writer module: a queue of one or more script segments of a script which continues the narrative;
   locking at least one of the script segments in the queue;
   generating, using one or more of the script segments and a script analysis module:
   respective script metadata for the one or more script segments of the script;
   generating, using the at least one of the script segments that are locked, the respective script metadata and one or more rendering modules: one or more video segments; and
   receiving feedback on one or more of the script segments in the queue that have not been locked;
   wherein the script analysis module includes: a sentiment module for generating sentiment metadata for the respective script metadata; a stage direction extraction module for generating a stage direction or stage direction metadata of the stage direction for the respective script metadata; a character extraction module for generating character metadata of a character action for the respective script metadata;
   and/or a scene direction module for generating scene direction metadata for the respective script metadata.

2. The script production method of claim 1, wherein the script seed input includes: i) a phrase and a character to speak the phrase; and ii) a stage direction.

3. The script production method of claim 2, wherein the script seed input includes: i) a second phrase and a second character to speak the second phrase.

4. The script production method of claim 1, wherein the script seed input includes: a system signal.

5. The script production method of claim 4, wherein the system signal includes: adding a character, removing a character, an error signal, a scene change, an animation trigger, a sound effect trigger, ending a scene, a lighting cue, a camera cues, or ending a show.

6. The script production method of claim 1, wherein the script seed input includes: an input text, an input image, an input video, or an input audio of a spoken narrative.

7. The script production method of claim 1:
   wherein at least one of the script segments includes: a phrase and a character speaking the phrase; and
   wherein at least one of the script segments includes: a stage direction.

8. The script production method of claim 7, wherein at least one of the script segments includes: a system signal.

9. The script production method of claim 8, wherein the system signal includes: adding a character, removing a character, an error signal, a scene change, an animation trigger, a sound effect trigger, ending a scene, a lighting cue, a camera cues, or ending a show.

10. The script production method of claim 7, wherein the one or more script segments are each in a common script segment message format.

11. The script production method of claim 1, wherein the script writer module includes: a remote natural language processing (NLP) module; a local NLP module; a chat bot module; and/or a news bot module.

12. The script production method of claim 1, wherein the generating the respective script metadata includes generating processing metadata using the script and the script analysis module, wherein the processing metadata is for technical introspection of one or more states of the script production method, managing performance of the script production method, and managing timing of message delivery between the script writer module, the script analysis module, and the one or more rendering modules.

13. The script production method of claim 1, wherein the generating of the respective script metadata includes generating audio metadata using the script and the script analysis module, wherein the audio metadata includes audio duration and audio sampling rate, wherein the generating the one or more video segments uses the audio metadata.

14. The script production method of claim 13, wherein at least one of the rendering modules includes a speech rendering module which uses the script and the audio metadata for generating audio enriching data of speech for the generating the one or more video segments.

15. The script production method of claim 13, wherein at least one of the rendering modules includes a music scoring module which uses the script and the audio metadata for generating audio enriching data of music for the generating the one or more video segments.

16. The script production method of claim 1, wherein the sentiment metadata includes sentiment data or emotion data, wherein the generating the one or more video segments uses the sentiment metadata.

17. The script production method of claim 1, wherein the generating the respective script metadata includes generating keyword metadata using the script and the script analysis module, wherein the keyword metadata includes at least one keyword extracted from a phrase of the script, wherein the at least one keyword is given higher weight by the script analysis module or one of the rendering modules, wherein the generating the one or more video segments uses the keyword metadata.

18. The script production method of claim 1, wherein the queue is generated in real-time as the at least one of the script segments are generated into the one or more video segments.

19. The script production method of claim 1, wherein the feedback includes an approval, an edit, or a deletion of at least one of the script segments in the queue.

20. The script production method of claim 1, wherein the feedback includes audience feedback from at least one device, and wherein the feedback includes director feedback from at least one of the devices.

21. The script production method of claim 20, wherein the generating the one or more video segments is generated from three way authorship of the script writer module, the director feedback, and the audience feedback.

22. The script production method of claim 1, further comprising storing the feedback, wherein the script writer module is configured to learn from the feedback.

23. The script production method of claim 1, wherein the one or more rendering modules include a back end rendering module and a front end rendering module, wherein the generating the one or more video segments includes:

generating, using the script, the respective script metadata, and the back end rendering module: audio enriching data and visual enriching data;

generating, using the audio enriching data, the visual enriching data, and the front end rendering module: the one or more video segments; and formatting, using the front end rendering module, the one or more video segments to a video format that is particular to a respective platform of one or more user devices.

24. The script production method of claim 23, wherein the back end rendering module includes an asset generation module.

25. The script production method of claim 24, wherein the asset generation module is configured to generate a character and/or an object in at least one the video segments.

26. The script production method of claim 1, further comprising receiving second feedback on the script metadata.

27. The script production method of claim 1, wherein the generating the script, the generating the respective script metadata, and the generating the one or more video segments are performed in real-time.

28. The script production method of claim 1, wherein the at least one of the script segments that have been generated into the one or more video segments are live published, wherein the receiving feedback is on one or more of the script segments in the queue that have not been live published.

29. The script production method of claim 1, wherein the at least one of the script segments that are locked are earlier in the queue and the one or more of the script segments in the queue that have not been locked are later in the queue.

30. The script production method of claim 1, wherein the generating the queue includes generating a plurality of different parallel queues each respectively having one or more of the script segments; further comprising receiving a selection of one of the different parallel queues.

31. The script production method of claim 30, wherein the receiving feedback is on the queue that is selected.

32. The script production method of claim 30, wherein the selection of the queue is performed by an automated selection system.

33. The script production method of claim 32, wherein the automated selection system takes into account the script seed input or further script seed inputs in relation to a middle of the narrative for performing the selection.

34. The script production method of claim 32, wherein the automated selection system includes a machine learning model.

35. The script production method of claim 1, further comprising receiving one or more further script seed inputs in relation to a middle of the narrative, wherein the generating the queue further uses the further script seed inputs.

36. The script production method of claim 35, wherein the one or more further script seed inputs are manually generated, extracted from a show structure document, or automatically generated by the script writer module.

37. The script production method of claim 35, wherein the one or more further script seed inputs include a natural language description of a character or a scene.

38. A show production system, comprising:
at least one processor; and
memory containing instructions which, when executed by the at least one processor, cause the at least one processor to perform the script production method as claimed in claim 1.

39. A non-transitory memory containing instructions which, when executed by at least one processor, cause the at least one processor to perform the script production method as claimed in claim 1.

40. A script production method, comprising:
receiving a script seed input that represents a beginning of a narrative;
generating, using the script seed input and a script writer module: a queue of one or more script segments of a script which continues the narrative;
locking at least one of the script segments in the queue;
generating, using one or more of the script segments and a script analysis module:
respective script metadata for the one or more script segments of the script;
generating, using the at least one of the script segments that are locked, the respective script metadata and one or more rendering modules: one or more video segments; and
receiving feedback on one or more of the script segments in the queue that have not been locked;
wherein the generating the respective script metadata includes generating processing metadata using the script and the script analysis module, wherein the processing metadata is for technical introspection of one or more states of the script production method, managing performance of the script production method, and managing timing of message delivery between the script writer module, the script analysis module, and the one or more rendering modules.

41. The script production method of claim 40, wherein the feedback comprises real-time feedback.

42. The script production method of claim 40, wherein the feedback comprises approval, edit, or deletion of at least one of the script segments in the queue that have not been locked, wherein the script writer module is configured to learn from the feedback.

43. A non-transitory memory containing instructions which, when executed by at least one processor, cause the at least one processor to perform the script production method as claimed in claim 40.

44. A script production method, comprising:
receiving a script seed input that represents a beginning of a narrative;
generating, using the script seed input and a script writer module: a queue of one or more script segments of a script which continues the narrative;
locking at least one of the script segments in the queue;
generating, using one or more of the script segments and a script analysis module:
respective script metadata for the one or more script segments of the script;
generating, using the at least one of the script segments that are locked, the respective script metadata and one or more rendering modules: one or more video segments; and
receiving feedback on one or more of the script segments in the queue that have not been locked;
wherein the generating the respective script metadata includes generating sentiment metadata using the script and the script analysis module, wherein the sentiment metadata includes sentiment data or emotion data, wherein the generating the one or more video segments uses the sentiment metadata.

45. The script production method of claim 44, wherein the generating the one or more video segments uses the sentiment metadata to convey sentiment or emotion within the narrative.

46. A non-transitory memory containing instructions which, when executed by at least one processor, cause the at least one processor to perform the script production method as claimed in claim 44.

47. A script production method, comprising:
receiving a script seed input that represents a beginning of a narrative;
generating, using the script seed input and a script writer module: a queue of one or more script segments of a script which continues the narrative;
locking at least one of the script segments in the queue;
generating, using one or more of the script segments and a script analysis module:
respective script metadata for the one or more script segments of the script;
generating, using the at least one of the script segments that are locked, the respective script metadata and one or more rendering modules: one or more video segments; and
receiving feedback on one or more of the script segments in the queue that have not been locked;
wherein the one or more rendering modules include a back end rendering module and a front end rendering module, wherein the generating the one or more video segments includes:
generating, using the script, the respective script metadata, and the back end rendering module: audio enriching data and visual enriching data;
generating, using the audio enriching data, the visual enriching data, and the front end rendering module: the one or more video segments; and
formatting, using the front end rendering module, the one or more video segments to a video format that is particular to a respective platform of one or more user devices.

48. The script production method of claim 47, wherein the back end rendering module includes an asset generation module configured to create content for the one or more video segments.

49. The script production method of claim 48, wherein the content includes a character and/or an object in at least one the video segments.

50. The script production method of claim 48, wherein the content includes a visual element, audio data, and/or a 3D asset.

51. The script production method of claim 48, wherein the content is continuous with the narrative.

52. A non-transitory memory containing instructions which, when executed by at least one processor, cause the at least one processor to perform the script production method as claimed in claim 47.

* * * * *